(12) United States Patent
Wardle et al.

(10) Patent No.: US 11,031,657 B2
(45) Date of Patent: Jun. 8, 2021

(54) SEPARATORS COMPRISING ELONGATED NANOSTRUCTURES AND ASSOCIATED DEVICES AND METHODS, INCLUDING DEVICES AND METHODS FOR ENERGY STORAGE AND/OR USE

(71) Applicant: Massachusetts Institute of Technology, Cambridge, MA (US)

(72) Inventors: Brian L. Wardle, Lexington, MA (US); Luiz Acauan, Somerville, MA (US); Yue Zhou, Quincy, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 160 days.

(21) Appl. No.: 16/203,374

(22) Filed: Nov. 28, 2018

(65) Prior Publication Data

US 2019/0189988 A1    Jun. 20, 2019

Related U.S. Application Data

(60) Provisional application No. 62/591,402, filed on Nov. 28, 2017.

(51) Int. Cl.
*H01M 50/449* (2021.01)
*H01G 11/52* (2013.01)
(Continued)

(52) U.S. Cl.
CPC .......... *H01M 50/449* (2021.01); *H01G 11/26* (2013.01); *H01G 11/52* (2013.01); *H01M 50/431* (2021.01); *H01M 50/44* (2021.01)

(58) Field of Classification Search
CPC .. H01M 2/1666; H01M 2/1613; H01G 11/52; H01G 11/26; Y02E 60/10
(Continued)

(56) References Cited

U.S. PATENT DOCUMENTS 3,580,731 A    5/1971  Milewski et al.
4,560,603 A   12/1985  Giacomel
(Continued)

FOREIGN PATENT DOCUMENTS

CN    102263221 A    11/2011
EP    1 489 630 A1   12/2004
(Continued)

OTHER PUBLICATIONS

International Preliminary Report on Patentability dated Jun. 11, 2020 for Application No. PCT/US2018/062797.
(Continued)

*Primary Examiner* — Gary D Harris
(74) *Attorney, Agent, or Firm* — Wolf, Greenfield & Sacks, P.C.

(57) ABSTRACT

The use of elongated nanostructures in separators and associated devices and methods, including devices and methods for energy storage and/or use, are generally described. According to certain embodiments, the elongated nanostructures can extend from a first solid substrate to a second solid substrate. In some embodiments, the nanostructures penetrate a surface of the first solid substrate (e.g., a first electrode) and/or a surface of the second solid substrate (e.g., a second electrode). The elongated nanostructures can, according to certain embodiments, provide structural reinforcement between two substrates (e.g., between two electrodes) while maintaining electronic insulation between the two substrates.

20 Claims, 15 Drawing Sheets

(51) Int. Cl.
*H01G 11/26* (2013.01)
*H01M 50/44* (2021.01)
*H01M 50/431* (2021.01)

(58) Field of Classification Search
USPC .................................................... 429/143
See application file for complete search history.

(56) References Cited

U.S. PATENT DOCUMENTS

| | | |
|---|---|---|
| 4,718,971 A | 1/1988 | Summers |
| 4,770,926 A | 9/1988 | Yamamura et al. |
| 4,892,693 A | 1/1990 | Perrotta et al. |
| 5,149,584 A | 9/1992 | Baker et al. |
| 5,540,126 A | 7/1996 | Piramoon |
| 5,580,502 A | 12/1996 | Forster et al. |
| 5,648,109 A | 7/1997 | Gutowski et al. |
| 5,847,283 A | 12/1998 | Finot et al. |
| 5,954,917 A | 9/1999 | Jackson et al. |
| 6,155,514 A | 12/2000 | Hailey et al. |
| 6,265,333 B1 | 7/2001 | Dzenis et al. |
| 6,420,293 B1 | 7/2002 | Chang et al. |
| 6,495,258 B1 | 12/2002 | Chen et al. |
| 7,060,241 B2 | 6/2006 | Glatkowski |
| 7,132,161 B2 | 11/2006 | Knowles et al. |
| 7,160,531 B1 | 1/2007 | Jacques et al. |
| 7,323,157 B2 | 1/2008 | Kinloch et al. |
| 7,537,825 B1 | 5/2009 | Wardle et al. |
| 7,727,624 B2 | 6/2010 | Cao et al. |
| 7,884,525 B2 | 2/2011 | Culpepper et al. |
| 8,130,007 B2 | 3/2012 | Eldridge et al. |
| 8,337,979 B2 | 12/2012 | Wardle et al. |
| 8,388,795 B2 | 3/2013 | Tsotsis |
| 8,638,113 B2 | 1/2014 | Crafts et al. |
| 8,987,707 B2 | 3/2015 | Arnold et al. |
| 9,181,639 B2 | 11/2015 | Hart et al. |
| 9,394,175 B2 | 7/2016 | Hart et al. |
| 9,478,610 B2 | 10/2016 | Hart et al. |
| 10,195,797 B2 | 2/2019 | Williams et al. |
| 2003/0012721 A1 | 1/2003 | Nakayama et al. |
| 2003/0096104 A1 | 5/2003 | Tobita et al. |
| 2003/0143453 A1 | 7/2003 | Ren et al. |
| 2003/0231471 A1 | 12/2003 | De Lorenzo et al. |
| 2003/0236588 A1 | 12/2003 | Jang et al. |
| 2004/0071870 A1 | 4/2004 | Knowles et al. |
| 2004/0097635 A1 | 5/2004 | Fan et al. |
| 2004/0099438 A1 | 5/2004 | Arthur et al. |
| 2004/0105807 A1 | 6/2004 | Fan et al. |
| 2004/0235376 A1 | 11/2004 | Byma et al. |
| 2004/0250950 A1 | 12/2004 | Dubrow |
| 2005/0064185 A1 | 3/2005 | Buretea et al. |
| 2005/0066883 A1 | 3/2005 | Dubrow et al. |
| 2005/0081983 A1 | 4/2005 | Nakayama et al. |
| 2005/0116336 A1 | 6/2005 | Chopra et al. |
| 2005/0130341 A1 | 6/2005 | Furukawa et al. |
| 2005/0152826 A1 | 7/2005 | Shatwell |
| 2005/0167647 A1 | 8/2005 | Huang et al. |
| 2005/0170089 A1 | 8/2005 | Lashmore et al. |
| 2005/0176329 A1 | 8/2005 | Olry et al. |
| 2005/0215049 A1 | 9/2005 | Horibe et al. |
| 2005/0224220 A1 | 10/2005 | Li et al. |
| 2006/0018018 A1 | 1/2006 | Nomura et al. |
| 2006/0062944 A1 | 3/2006 | Gardner et al. |
| 2006/0073089 A1 | 4/2006 | Ajayan et al. |
| 2006/0166003 A1 | 7/2006 | Khabashesku et al. |
| 2006/0231970 A1 | 10/2006 | Huang et al. |
| 2006/0240238 A1 | 10/2006 | Boussard et al. |
| 2006/0252853 A1 | 11/2006 | Ajayan et al. |
| 2006/0260751 A1 | 11/2006 | Lauder et al. |
| 2006/0270790 A1 | 11/2006 | Comeau |
| 2007/0004081 A1 | 1/2007 | Hsiao |
| 2007/0076349 A1 | 4/2007 | Dementiev et al. |
| 2007/0090489 A1 | 4/2007 | Hart et al. |
| 2007/0092431 A1 | 4/2007 | Resasco et al. |
| 2007/0128960 A1 | 6/2007 | Nejhad et al. |
| 2007/0190880 A1 | 8/2007 | Dubrow et al. |
| 2007/0244245 A1 | 10/2007 | Liu et al. |
| 2008/0018012 A1 | 1/2008 | Lemaire et al. |
| 2008/0075954 A1 | 3/2008 | Wardle et al. |
| 2008/0086564 A1 | 4/2008 | Putman et al. |
| 2008/0170982 A1 | 7/2008 | Zhang et al. |
| 2008/0187648 A1 | 8/2008 | Hart et al. |
| 2008/0280137 A1 | 11/2008 | Ajayan et al. |
| 2008/0286564 A1 | 11/2008 | Tsotsis |
| 2009/0075157 A1 | 3/2009 | Pak et al. |
| 2009/0117363 A1 | 5/2009 | Wardle et al. |
| 2009/0266477 A1 | 10/2009 | Weisenberger et al. |
| 2009/0311166 A1* | 12/2009 | Hart ............... D01F 9/133 423/445 B |
| 2010/0192851 A1 | 8/2010 | Shah et al. |
| 2010/0196695 A1 | 8/2010 | Garcia et al. |
| 2010/0255303 A1 | 10/2010 | Wardle et al. |
| 2010/0276072 A1 | 11/2010 | Shah et al. |
| 2010/0279569 A1 | 11/2010 | Shah et al. |
| 2011/0133135 A1 | 6/2011 | Maeno et al. |
| 2011/0159270 A9 | 6/2011 | Davis et al. |
| 2011/0200883 A1 | 8/2011 | Cui et al. |
| 2012/0003524 A1 | 1/2012 | Jo et al. |
| 2012/0015098 A1 | 1/2012 | Cheng et al. |
| 2012/0088056 A1 | 4/2012 | Hallander et al. |
| 2012/0164903 A1 | 6/2012 | Wardle et al. |
| 2012/0251432 A1 | 10/2012 | Cooper et al. |
| 2012/0282453 A1 | 11/2012 | Wang et al. |
| 2013/0029089 A1 | 1/2013 | Kia |
| 2013/0142987 A1 | 6/2013 | Wardle et al. |
| 2014/0127490 A1 | 5/2014 | Islam et al. |
| 2014/0154412 A1 | 6/2014 | Malecki et al. |
| 2014/0186547 A1 | 7/2014 | Wu et al. |
| 2014/0295166 A1 | 10/2014 | Steiner, III et al. |
| 2015/0000960 A1 | 1/2015 | Gaynor et al. |
| 2015/0037517 A1 | 2/2015 | Buriak et al. |
| 2015/0053927 A1 | 2/2015 | Arnold et al. |
| 2015/0360424 A1 | 12/2015 | Williams et al. |
| 2016/0083256 A1 | 3/2016 | Hart et al. |
| 2016/0340482 A1 | 11/2016 | Williams et al. |
| 2017/0057823 A1 | 3/2017 | Hart et al. |
| 2017/0110215 A1 | 4/2017 | Wright et al. |
| 2017/0179853 A1 | 6/2017 | Choi et al. |
| 2017/0341316 A1 | 11/2017 | Wardle et al. |

FOREIGN PATENT DOCUMENTS

| | | |
|---|---|---|
| EP | 1 637 828 A2 | 3/2006 |
| EP | 1 652 573 A1 | 5/2006 |
| EP | 2330077 A1 | 6/2011 |
| FR | 2865739 A1 | 8/2005 |
| JP | S50-119071 A | 9/1975 |
| JP | 63-93374 A | 4/1988 |
| JP | 63-97257 A | 4/1988 |
| JP | 2-17964 A | 1/1990 |
| JP | 2-147270 U | 12/1990 |
| JP | 2000-172202 A | 6/2000 |
| JP | 2001-080912 A | 3/2001 |
| JP | 2001-291465 A | 10/2001 |
| JP | 2002-141633 A | 5/2002 |
| JP | 2002-206169 A | 7/2002 |
| JP | 2002-293518 A | 10/2002 |
| JP | 2003-500325 A | 1/2003 |
| JP | 2003-119295 A | 4/2003 |
| JP | 2003-249166 A | 9/2003 |
| JP | 2003-286017 A | 10/2003 |
| JP | 2004-030926 A | 1/2004 |
| JP | 2004-55158 A | 2/2004 |
| JP | 2004-268192 A | 9/2004 |
| JP | 2005-007861 A | 1/2005 |
| JP | 2005-22141 A | 1/2005 |
| JP | 2005-068000 A | 3/2005 |
| JP | 2005-078880 A | 3/2005 |
| JP | 2005-170787 A | 6/2005 |
| JP | 2005-200676 A | 7/2005 |
| JP | 2005-256222 A | 9/2005 |
| JP | 2005-285821 A | 10/2005 |
| JP | 2005-302305 A | 10/2005 |
| JP | 2005-538026 A | 12/2005 |
| JP | 2006-008473 A | 1/2006 |

(56) References Cited

FOREIGN PATENT DOCUMENTS

| | | |
|---|---|---|
| JP | 2006-011296 A | 1/2006 |
| JP | 2006-095429 A | 4/2006 |
| JP | 2006-206169 A | 8/2006 |
| JP | 2006-228818 A | 8/2006 |
| JP | 2006-295120 A | 10/2006 |
| JP | 2007-515364 A | 6/2007 |
| JP | 2007-523033 A | 8/2007 |
| JP | 2008-044099 A | 2/2008 |
| JP | 2009-517531 A | 4/2009 |
| JP | 2009-537339 A | 10/2009 |
| JP | 2009-537439 A | 10/2009 |
| JP | 2010-027251 A | 2/2010 |
| JP | 2010-257975 A | 11/2010 |
| JP | 4883841 B2 | 2/2012 |
| JP | 2012-087016 A | 5/2012 |
| JP | 2012-510426 A | 5/2012 |
| WO | WO 01/94260 A1 | 12/2001 |
| WO | WO 03/049219 A1 | 6/2003 |
| WO | WO 03/069019 A1 | 8/2003 |
| WO | WO 03/093174 A1 | 11/2003 |
| WO | WO 2004/094303 A2 | 11/2004 |
| WO | WO 2005/028549 A2 | 3/2005 |
| WO | WO 2005/044723 A2 | 5/2005 |
| WO | WO 2005/075341 A2 | 8/2005 |
| WO | WO 2006/120803 A1 | 11/2006 |
| WO | WO 2006/135375 A2 | 12/2006 |
| WO | WO 2007/055744 A2 | 5/2007 |
| WO | WO 2007/116706 A1 | 10/2007 |
| WO | WO 2007/136755 A2 | 11/2007 |
| WO | WO 2008/054409 A2 | 5/2008 |
| WO | WO 2008/054541 A2 | 5/2008 |
| WO | WO 2008/103221 A1 | 8/2008 |
| WO | WO 2009/029218 A2 | 3/2009 |
| WO | WO 2011/106109 A2 | 9/2011 |
| WO | WO 2012/074367 A1 | 6/2012 |
| WO | WO 2014/197078 A2 | 12/2014 |
| WO | WO 2015/199785 A2 | 12/2015 |

OTHER PUBLICATIONS

International Search Report and Written Opinion dated Feb. 15, 2019 for International Application No. PCT/US2018/062797.
U.S. Appl. No. 60/417,959, filed Oct. 11, 2002, Kim.
U.S. Appl. No. 60/740,461, filed Nov. 28, 2005, Nejhad.
[No Author Listed] Buckypaper systems for treatment of acute wounds. NanoTech Briefs. 2005, 2 pages.
Abreha et al., Ionic conductivity and transport properties of poly(vinylidene fluoride-co-hexafluoropropylene)-based solid polymer electrolytes. Chem Phys Lett. 2016;658:240-7. Epub Jun. 23, 2016.
Ahn et al., Simultaneous measurements of permeability and capillary pressure of thermosetting matrices in woven fabric reinforcements. Polym. Compos. Jun. 1991;12(3):146-52.
Ajayan et al.., Materials science—Nanotube composites. Nature. Jun. 28, 2007;447(7148):1066-8.
Amico et al., An experimental study of the permeability and capillary pressure in resin-transfer moulding. Compos. Sci. Technol. 2001;61(13):1945-59.
Andrews et al., Continuous production of aligned carbon nanotubes: a step closer to commercial realization. Chem Phys Lett. Apr. 16, 1999;303(5-6):467-74.
Aravand et al., Internal geometry of woven composite laminates with "fuzzy" carbon nanotube grafted fibers. Composites: Part A. 2016;88:295-304. Epub Jun. 16, 2016.
ASP, Multifunctional composite materials for energy storage in structural load paths. Plast Rubber Compos. 2013;42(4):144-9.
ASTM D2344/D2344M-16, Standard Test Method for Short-Beam Strength of Polymer Matrix Composite Materials and Their Laminates. ASTM International: West Conshohocken, PA, 2016. 8 pages.
ASTM D790-17, Standard Test Methods for Flexural Properties of Unreinforced and Reinforced Plastics and Electrical Insulating Materials. ASTM International: West Conshohocken, PA, 2017. 12 pages.

Barber et al., Measurement of carbon nanotube-polymer interfacial strength. Applied Physics Letters. Jun. 9, 2003;82(23): 4140-2.
Bauhofer et al., A review and analysis of electrical percolation in carbon nanotube polymer composites. Compos Sci Technol. 2009;69:1486-98. doi:10.1016/j.compscitech.2008.06.018, 13 pages. Epub Jun. 25, 2008.
Bennett et al., Controlling the morphology of carbon nanotube films by varying the areal density of catalyst nanoclusters using block copolymer micellar thin films. Advanced Materials. Sep. 2006; 18(17): 2274-9.
Bennett et al., Creating patterned carbon nanotube catalysts through the microcontact printing of block copolymer micellar thin films. Langmuir. Sep. 26, 2006;22(20):8273-6.
Bennett et al., Using block copolymer micellar thin films as templates for the production of catalysts for carbon nanotube growth. Chemistry of Materials. Nov. 25, 2004; 16(26): 5589-98. DOI: 10.1021/cm0489921.
Bhattacharya, Polymer nanocomposites—A comparison between carbon nanotubes, graphene, and clay as nanofillers. Materials. 2016;9:262(1-35). Epub Apr. 1, 2016.
Blanco et al., Limiting mechanisms of Mode 1 interlaminar toughening of composites reinforced with aligned carbon nanotubes. J. Composite Mater. Apr. 2009; 43(8):825-41. doi: 10.1177/0021998309102398.
Boncel et al., Dynamics of capillary infiltration of liquids into a highly aligned multi-walled carbon nanotube film. Beilstein J. Nanotechnol. 2011;2:311-7. Epub Jun. 20, 2011.
Boskovic et al., Low temperature synthesis of carbon nanofibres on carbon fibre matrices. Carbon. Nov. 2005;43(13): 2643-8. doi:10.1016/j.carbon.2005.04.034.
Bradshaw et al., Fiber waviness in nanotube-reinforced polymer composites—II: modeling via numerical approximation of the dilute strain concentration tensor. Comp Sci Technol. 2003;63:1705-22.
Breuer et al., Big returns from small fibers: a review of polymer/carbon nanotube composites. Polymer Composites. Dec. 2004; 25(6), 630-45. DOI: 10.1002/pc.20058.
Brunauer et al., Adsorption of gases in multimolecular layers. J Am Chem Soc. Feeb. 1938; 60(2):309-319.
Campbell, Polymer Matrix Composites. Ch. 7 in Manuf. Tech for Aerospace Structural Materials. 2006. Elsevier. pp. 273-368.
Cao et al., Microporous PVDF-HFP-based polymer membranes formed from supercritical $CO_2$ induced phase separation. Chin J Polym Sci. 2008;26(1):13-21.
Cao et al., Multifunctional brushes made from carbon nanotubes. Nat Mater. Jul. 2005;4(7):540-5. Epub Jun. 12, 2005.
Capuano et al., Composite Polymer Electrolytes. J Electrochem Soc. Jul. 1991;138 (7):1918 -22.
Carlson et al., Structural capacitor materials made from carbon fibre epoxy composites. Compos Sci Technol. 2010;70(7):1135-40. Epub Mar. 10, 2010.
Cebeci et al., Multifunctional properties of high volume fraction aligned carbon nanotube polymer composites with controlled morphology. Compos. Sci. Technol. 2009;69:2649-56. Epub Aug. 19, 2009.
Cebeci et al., Processing of hybrid advanced composites utilizing capillarity-driven wetting of aligned carbon nanotubes. In 2008 SAMPE Fall Tech Conf and Exhibition- Multifunctional Materials: Working Smarter Together (SAMPE '08). Memphis, TN. Sep. 2008.
Chand, Review carbon fibers for composites. J Mater Sci. Mar. 2000;35(6):1303-13.
Chee et al., Nanocomposites of graphene/polymers: A review. RSC Adv. 2015;5:68014-51.
Cheng, Measurement of surface tension of epoxy resins used in dispensing process for manufacturing thin film transistor-liquid crystal displays. IEEE Transactions on Advanced Packaging. Feb. 2008; 31(1):100-6.
Christodolou et al., Multifunctional material systems: The first generation. JOM. Dec. 2003;55(12):39-45.
Chu, MIT News, Taking aircraft manufacturing out of the oven. Apr. 14, 2015; 3 pages. http://news.mit.edu/2015/carbon-nanotube-film-heats-composite-materials-0414 . . . .

(56) References Cited

OTHER PUBLICATIONS

Ci et al., Direct growth of carbon nanotubes on the surface of ceramic fibers. Carbon. Jan. 2005;43(4): 883-6. doi:10.1016/j.carbon.2004.11.010.
Coleman et al., High-performance nanotube-reinforced plastics: understanding the mechanism of strength increase. Advanced Functional Materials. Aug. 2004; 14(8): 791-8. doi: 10.1002/adfm.200305200.
Coleman et al., Improving the mechanical properties of single-walled carbon nanotube sheets by intercalation of polymeric adhesives. Applied Physics Letters. Mar. 17, 2003; 82(11): 1682-4.
Coleman et al., Small but strong: A review of the mechanical properties of carbon nanotube-polymer composites. Carbon. Aug. 2006; 44(9): 1624-1652. doi:10.1016/j.carbon.2006.02.038.
Conway, Electrochemical Supercapacitors: Scientific Fundamentals and Technological Applications. Spring Science & Business Media, LLC: New York. 1999. 714 pages. Submitted in 3 parts.
Cooper et al., Detachment of nanotubes from a polymer matrix. Applied Physics Letters. Nov. 11, 2002; 81(20): 3873-5.
Deka et al., Large pulsed electron beam (LPEB)-processed woven carbon fiber/ZnO nanorod/polyester resin composites. Compos Sci Technol. 2014;102:106-12. Epub Aug. 4, 2014.
Deka et al., Multifunctional CuO nanowire embodied structural supercapacitor based on woven carbon fiber/ionic liquid-polyester resin. Compos: Part A. 2016;87:256-62. Epub May 7, 2016.
Du et al., Effect of nanotube alignment on percolation conductivity in carbon nanotube/polymer composites. Physical Review B. Sep. 2005; 72(12): 121404-1. DOI: 10.1103/PhysRevB.72.121404.
Endo et al., Atomic nanotube welders: boron interstitials triggering connections in double-walled carbon nanotubes. Nano Lett. Jun. 2005;5(6):1099-105.
Ergun et al., Fluid flow through randomly packed columns and fluidized beds. Industrial & Engineering Chemistry. 1949;41(6):1179-84.
Fan et al., Carbon nanotube arrays on silicon substrates and their possible application. Physica E. Aug. 2000;8(2):179-83.
Fan et al., Experimental investigation of dispersion during flow of multi-walled carbon nanotube/polymer suspension in fibrous porous media. Carbon. 2004;42(4):871-6.
Fan et al., Self-oriented regular arrays of carbon nanotubes and their field emission properties. Science. Jan. 22, 2009; 283(5401): 512-514.
Fisher et al., Anion effects on solid polymer electrolytes containing sulfur based ionic liquid for lithium batteries. J Electrochem Soc. 2012;159(5):A592-597. Epub Mar. 2, 2012.
Gao et al., In situ sensing of impact damage in epoxy/glass fiber composites using percolating carbon nanotube networks. Carbon. 2011;49(10):3382-5. Epub Apr. 9, 2011.
Garcia et al, Joining prepreg composite interfaces with aligned carbon nanotubes. Composites: Part A. 2008;39(6):1065-70.
Garcia et al., (Student Paper) Fabrication and testing of long carbon nanotubes grown on the surface of fibers for hybrid composites. Presented at the 47th AIAA/ASME/ASCE/AJS/ASC Structures, Structural Dynamics, and Materials Conference, Newport, R.I., May 14, 2006, 11 pages.
Garcia et al., Fabrication of composite microstructures by capillarity-driven wetting of aligned carbon nanotubes with polymers. Nanotechnol. 2007; 18:165602(1-11). Epub Mar. 13, 2007.
Gibson, A review of recent research on mechanics of multifunctional composite materials and structures. Composite Structures 2010;92(12):2793-2810. Epub May 8, 2010.
Guzman de Villoria et al., In-plane strength enhancement of laminated composites via aligned carbon nanotube interlaminar reinforcement. Compos Sci Technol. 2016;133:33-9. Epub Jul. 13, 2016.
Guzman de Villoria et al., Multi-physics damage sensing in nano-engineered structural composites. Nanotechnol. 2011;22(18):185502(1-7). Epub Mar. 22, 2011.
Harris. Carbon nanotube composites. International Materials Reviews. 2004;49(1):31-43.

Hart et al., Desktop growth of carbon-nanotube monoliths with in situ optical imaging. Small. may 2007;3(5):772-7.
Hart et al., Force output, control of film structure, and microscale shape transfer by carbon nanotube growth under mechanical pressure. Nano Lett. Jun. 2006;6(6):1254-60.
Hart et al., Growth of conformal single-walled carbon nanotube films from Mo/Fe/Al2O3 deposited by electron beam evaporation. Carbon. Feb. 2006; 44(2): 348-59.
Hart et al., Rapid growth and flow-mediated nucleation of millimeter-scale aligned carbon nanotube structures from a thin-film catalyst. J Phys Chem B. Apr. 27, 2006;110(16):8250-7. Epub Mar. 11, 2006.
Hart et al., Versatility of the Fe/Al$_2$O$_3$ system for high-yield carbon nanotube growth by thermal CVD of C$_2$H$_4$. NT05: Sixth International Conference on the Science and Application of Nanotubes; Göteborg University, Chalmers University of Technology, and University College of Borås; (Gothenburg, Sweden); Jun. 26-Jul. 1, 2005. Abstract, 1 page.
Hart et al., Versatility of the Fe/Al2O3 system for high-yield carbon nanotube growth by thermal CVD of C2H4. NT05: Sixth International Conference on the Science and Application of Nanotubes; Göteborg University, Chalmers University of Technology, and University College of Borås; (Gothenburg, Sweden); Jun. 26-Jul. 1, 2005. Poster, 1 page.
Hart, A.J., "Chemical, mechanical, and thermal control of substrate-bound carbon nanotube growth." Doctoral Thesis, Department of Mechanical Engineering, 2007 Dec. 31, 2006, 357 pages.
Hong et al., Synthesis of carbon nanotubes using microwave radiation. Adv Funct Mater. Dec. 2003;13(12):961-6.
Hsieh et al., The effect of carbon nanotubes on the fracture toughness and fatigue performance of a thermosetting epoxy polymer. J Mater Sci. 2011;46:7525-35.
Hubert et al., Autoclave processing for composites. Ch. 13 in Manufacturing Techniques for Polymer Matrix Composites (PMCs). Ed. by Advani et al., pp. 414-434. Woodhead Publishing Ltd.: Cambridge, England. 2012.
Huh et al., Control of carbon nanotube growth using cobalt nanoparticles as catalyst. Applied Surface Science.Elsevier. Aug. 2005; 249(1-4):145-50. DOI: 10.1016/j.apsusc.2004.11.059.
Ishiguro et al., Processing and characterization of infusion-processed hybrid composites with in situ grown aligned carbon nanotubes. 50th AIAA/ASME/ASCE/AHS/ASC Structures, Structural Dynamics, and Materials Conference. May 4-7, 2009. Palm Springs, CA. AIAA 2009-2541. 9 pages.
Javaid et al., Multifunctional structural supercapacitors for electrical energy storage applications. J Compos Mater. 2014;48(12):1409-16. Epub May 15, 2013.
Jayasuriya et al., Ferroelectric behavior in solvent cast poly(vinylidene fluoride/hexafluoropropylene) copolymer films. Appl Surf Sci. 2001;175-176:386-90.
Kalnaus et al., Strain distribution and failure mode of polymer separators for Li-ion batteries under biaxial loading. J Power Sources. Feb. 28, 2018;378:139-45. Epub Dec. 16, 2017.
Karabelli et al., Poly(vinylidene fluoride)-based macroporous separators for supercapacitors. Electrochim Acta 2011;57:98-103. Epub Apr. 28, 2011.
Ke et al., Controlling the morphology and property of carbon fiber/polyaniline composites for supercapacitor electrode materials by surface functionalization. RSC Adv. 2016;6:14712-9. Epub Jan. 29, 2016.
Kim et al., Supercapacitive properties of activated carbon electrode in potassium-polyacrylate hydrogel electrolytes. J Appl Electrochem. May 2016;46(5):567-73. Epub Jan. 23, 2016.
Kis et al., Reinforcement of single-walled carbon nanotube bundles by intertube bridging. Nat Mater. Mar. 2004;3(3):153-7. Epub Feb. 15, 2004.
Koratkar et al., Multifunctional structural reinforcement featuring carbon nanotube films. Composites Science and Technology. Jul. 2003; 63: 1525-31. doi:10.1016/S0266-3538(03)00065-4.
Krasheninnikov et al., Ion-irradiation-induced welding of carbon nanotubes. Physical Review B.Dec. 2002; 66(24):245403-1-6. doi: 10.1103/PhysRevB.66.245403.

(56) References Cited

OTHER PUBLICATIONS

Krasheninnikov et al., Irradiation effects in carbon nanotubes. Nuclear Instruments and Methods in Physics Research B. Feb. 2004;216:355-66.

Kuentzer et al., Permeability characterization of dual scale fibrous porous media. Composites: Part A. 2006;37(11):2057-68.

Kundalwal et al., Effective thermal conductivities of a novel fuzzy fiber-reinforced composite containing wavy carbon nanotubes. Journal of Heat Transfer. Jan. 2015;137:012401-1-012401-12.

Kwok et al., Continuous deposition of carbon nanotubes on a moving substrate by open-air laser-induced chemical vapor deposition. Carbon. Oct. 2005; 43(12): 2571-8.

Lee et al., Aligned carbon nanotube film enables thermally induced state transformations in layered polymeric materials. ACS Appl Mater Interf. 2015;7:8900-05. Epub Apr. 15, 2015.

Lee et al., Carbon fiber prepreg composite laminates cured via conductive curing using nanoengineered nanocomposite heaters. 21st Intl Conf on Composite Materials. Xi'An, China. Aug. 2017. 8 pages.

Lee et al., Impact of carbon nanotube length on electron transport in aligned carbon nanotube networks. Appl Phys Lett. 2015;106:053110(1-5). Epub Feb. 4, 2015.

Leite et al., Hybrid organic-inorganic polymer: A new approach for the development of decoupled polymer electrolytes. Chem Mater. Sep. 2005;17(18):4561-3. Epub Aug. 12, 2005.

Lewandowski et al., Practical and theoretical limits for electrochemical double-layer capacitors. J Power Sources. 2007;173(2):822-8. Epub May 21, 2007.

Li et al., Compressive and flexural behavior of ultra-high modulus polyethylene fiber and carbon fiber hybrid composites. Compos Sci Technol. 1999;59(1):13-8.

Li et al., Hierarchical carbon nanotube carbon fiber unidirectional composites with preserved tensile and interfacial properties. Compos Sci Technol. 2015;117:139-145. Epub Apr. 30, 2015.

Liao et al., Nano-sponge ionic liquid-polymer composite electrolytes for solid-state lithium power sources. J Power Sources. 2010;195(3):867-71. Epub Aug. 20, 2009.

Liu et al., Enhancing ionic conductivity in composite polymer electrolytes with well-aligned ceramic nanowires. Nat Energy. Apr. 2017;2:17035(1-7).

Liu et al., Industrial polymer matrix composites and fiber-glass-reinforced plastics. In Yi et al. (Eds), Compos Mater Engin, vol. 2:165-303. Springer: Singapore. Epub Nov. 7, 2017.

Liu et al., Poptube approach for ultrafast carbon nanotube growth. Chem Commun. 2011;47(35):9912-4. Epub Aug. 8, 2011.

Lomov et al., Compressibility of nanofibre-grafted alumina fabric and yarns: Aligned carbon nanotube forests. Compos Sci Technol. 2014;90:57-66. Epub Nov. 4, 2013.

Louis et al., Out-of-Autoclave Prepreg Processing. In Wiley Encyclopedia of Composites, Second Ed., vol. 5. Jul. 2012. Wiley & Sons. https://doi.org/10.1002/9781118097298.weoc056. 5 pages.

Love, Thermomechanical analysis and durability of commercial micro-porous polymer Li-ion battery separators. J Power Sources. Mar. 1, 2011;196(5):2905-12. Epub Nov. 3, 2010.

Macfarlane et al., Energy applications of ionic liquids. Energy Environ Sci. Jan. 2014;7(1):232-50. Epub Aug. 15, 2013.

Malmonge et al., Study of pyroelectric activity of PZT/PVDF-HFP composite. Mater Res. 2003;6(4):469-73.

Mazumdar, Composites Manufacturing: Materials, Product, and Process Engineering. Section 6.8.1.5 Methods of Applying Heat and Pressure. CRC Press. 2002. 5 pages.

Mehdikhani et al., Strain mapping at the micro-scale in hierarchical polymer composites with aligned carbon nanotube grafted fibers. Compos Sci Technol. 2016;137:24-34. Epub Oct. 24, 2016.

Merchan-Merchan et al., High flame synthesis of vertically aligned carbon nanotubes using electric field control. Carbon.2004:42:599-608.

Merlet et al., On the molecular origin of supercapacitance in nanoporous carbon electrodes. Nat Mater. Apr. 2012;11(4):306-10. doi: 10.1038/nmat3260. Epub Mar. 4, 2012.

Minus et al., The processing, properties, and structure of carbon fibers. JOM. Feb. 2005;57(2):52-8.

Mistry et al., Addressing engineering issues for a composite structural power demonstrator. Proc Intl Conf on Compos Mater 2013 (ICCM-19), Montreal, CA, Jul. 28-Aug. 2, 2013. pp. 2692-2701. 9 pages.

Motamedi et al., Effect of straight and wavy carbon nanotube on the reinforcement modulus in nonlinear elastic matrix nanocomposites. Mater and Design. Feb. 2012;34:603-8.

Nair et al., Novel cellulose reinforcement for polymer electrolyte membranes with outstanding mechanical properties. Electrochim Acta. 2011;57:104-11. Epub Apr. 8, 2011.

Natarajan et al., The evolution of carbon nanotube network structure in unidirectional nanocomposites resolved by quantitative electron tomography, with Supplemental Information. ACS Nano. 2015;9(6):6050-8. doi: 10.1021/acsnano.5b01044, Epub Jun. 1, 2015, 20 pages.

O'Brien et al., Design and performance of multifunctional structural composite capacitors. J Compos Mater. 2011;45(26):2797-2809.

O'Brien, Energy-Storing Structures: Composite Capacitors and Batteries. US Army RDECOM. Army Research Laboratory, $2^{nd}$ Multifunctional Materials for Defense Workshop. Jul. 30, 2012. 30 pages.

Okajima et al., Capacitance behavior of activated carbon fibers with oxygen-plasma treatment. Electrochim Acta. 2005;50(11):2227-31.

Olivier et al., Effects of cure cycle pressure and voids on some mechanical properties of carbon/epoxy laminates. Composites. 1995;26(7):509-15.

Padmanathan et al., Controlled growth of spinel $NiCo_2O_4$ nanostructures on carbon cloth as a superior electrode for supercapacitors. RSC Adv. 2014;4(16):8341-9. Epub Dec. 5, 2013.

Parnas et al., the interaction between micro- and macroscopic flow in RTM preforms. Composite Structures. 1994;27(1-2):93-107.

Pech et al., Ultrahigh-power micrometre-sized supercapacitors based on onion-like carbon. Nat Nanotechnol. Sep. 2010;5(9):651-4. doi: 10.1038/nnano.2010.162. Epub Aug. 15, 2010.

Pradhan et al., Studies of dielectric and electrical properties of plasticized polymer nanocomposite electrolytes. Mater Chem Phys. Jun. 2009;115(2-3):557-61.

Qian et al., Carbon nanotube-based hierarchical composites: A review. J Mater Chem. 2010;20(23):4751-62.

Qian et al., Multifunctional structural supercapacitor composites based on carbon aerogel modified high performance carbon fiber fabric. ACS Appl Mater Interfaces. Jul. 10, 2013;5(13):6113-22. doi: 10.1021/am400947j. Epub Jun. 7, 2013. Epub May 13, 2013.

Ray et al., Load transfer analysis in short carbon fibers with radially-aligned carbon nanotubes embedded in a polymer matrix. J. Adv. Mater. Oct. 2009;41(4):82-94.

Romanov et al., Can carbon nanotubes grown on fibers change stress distribution in a composite? Composites: Part A. 2014;63:32-4. Epub Apr. 5, 2014.

Sager et al., Effect of carbon nanotubes on the interfacial shear strength of T650 carbon fiber in an epoxy matrix. Compos Sci Technol. 2009;69:898-904. Epub Feb. 23, 2009.

Sandler et al., Ultra-low electrical percolation threshold in carbon-nanotube-epoxy composites. Polymer. Sep. 2003; 44(19): 5893-9.

Schlimbach et al., Out-of-autoclave curing process in polymer matrix composites. Ch. 14 in Manufacturing Techniques for Polymer Matrix Composites (PMCs). Ed. by Advani et al., pp. 435-480. Woodhead Publishing Ltd.: Cambridge, England. 2012.

Shirshova et al., Structural composite supercapacitors. Compos Part A. Mar. 2013; 46:96-107. Epub Nov. 5, 2012.

Shirshova et al., Structural supercapacitor electrolytes based on bicontinuous ionic liquid-epoxy resin systems. J Mater Chem A. 2013;1:15300-9. Epub Nov. 11, 2013.

Skartsis et al., Resin flow through fiber beds during composite manufacturing processes. Part I: Review of newtonian flow through fiber beds. Polym Eng Sci. Feb. 1992;32(4):221-30.

Snyder et al., Energy density and rate limitations in structural composite supercapacitors. Proc SPIE 8377, Energy Harvesting and Storage: Materials, Devices, and Applications III, 837709(1-8), May 24, 2012. doi: 10.1117/12.923030.

(56) References Cited

OTHER PUBLICATIONS

Snyder et al., Improving multifunctional behavior in structural electrolytes through copolymerization of structure- and conductivity-promoting monomers. Polymer. Sep. 2009;50(20):4906-16. Epub Aug. 8, 2009.
Soutis, Carbon fiber reinforced plastics in aircraft construction. Mater Sci Engin A. Dec. 2005;412(1-2):171-6.
Spitalsky et al., Carbon nanotube-polymer composites: Chemistry, processing, mechanical and electrical properties. Progress in Polymer Science 2010;35(3):357-401. Epub Sep. 25, 2009.
Stein et al., Aligned carbon nanotube array stiffness from stochastic three-dimensional morphology. Nanoscale. 2015;7:19426-31.
Sun et al., Effects of separator on the electrochemical performance of electrical double-layer capacitor and hybrid battery-supercapacitor. Acta Phys—Chim Sin. 2014;30(3):485-91. Epub Jan. 13, 2014.
Swolfs et al., Stress concentrations in hybrid unidirectional fibre-reinforced composites with random fibre packings. Compos Sci Technol. 2013;85:10-16. Epub Jun. 1, 2013.
Tammela et al., the influence of electrode and separator thickness on the cell resistance of symmetric cellulose-polypyrrole-based electric energy storage devices. J Power Sources. Dec. 25, 2014;272:468-75. Epub Sep. 1, 2014.
Tao et al., Solid-state high performance flexible supercapacitors based on polypyrrole-$MnO_2$-carbon fiber hybrid structure. Sci Rep. 2013;3:2286(1-7). doi: 10.1038/srep02286. Epub Jul. 25, 2013.
Terrones et al., Controlled production of aligned-nanotube bundles. Nature. Jul. 3, 1997; 388(6637): 52-5.
Thomas et al., Mechanical design and performance of composite multifunctional materials. Acta Materialia. May 2004;52:2155-64.
Thostenson et al., Advances in the science and technology of carbon nanotubes and their composites: A Review. Composites Science and Technology.Oct. 2001; 61(13):1899-1912.
Thostenson et al., Carbon nanotube/carbon fiber hybrid multiscale composites. Journal of Applied Physics. Apr. 2002;91(9): 6034-7.
Thostenson et al., Nanocomposites in context. Composites Science and Technology. Mar. 2005; 65(3-4):491-516. doi:10.1016/j.compscitech.2004.11.003.
Vaisman et al., The role of surfactants in dispersion of carbon nanotubes. Adv Colloid Interface Sci. 2006;128-130:37-46. Epub Jan. 10, 2007.
Van Noorden, The trials of the new carbon. Nature. 2011; 469:14-16.
Veedu et al., Multifunctional composites using reinforced laminae with carbon-nanotube forests. Nature Materials. Jun. 2006; 5:457-62.
Wagner et al., Nanotube-polymer adhesion: a mechanics approach. Chemical Physics Letters. Jul. 24, 2002; 361(1-2):57-61.
Wardle et al., Fabrication and characterization of ultrahigh-volume-fraction aligned carbon nanotube-polymer composites. Adv Mater. 2008;20:2707-14.
Washburn, The dynamics of capillary flow. Phys. Rev. 1921;17(3):273-83.
Wicks et al., Interlaminar and intralaminar reinforcement of composite laminates with aligned carbon nanotubes. Compos. Sci. Technol. 2010;70(1):20-28.
Wicks et al., Multi-scale interlaminar fracture mechanisms in woven composite laminates reinforced with aligned carbon nanotubes. Compo. Sci. Technol. 2014;100:128-35.
Wieczorek et al., Modifications of crystalline structure of PEO polymer electrolytes with ceramic additives. Solid State Ionics. Nov. 1989;36(3-4):255-7.
Willgert et al., Photoinduced free radical polymerization of thermoset lithium battery electrolytes. Eur Polym J. 2011;47(12):2372-8. Epub Sep. 29, 2011.
Wu et al., Carbon nanotube film interlayer for strain and damage sensing in composites during dynamic compressive loading. Appl Phys Lett 2012;101(22):221909.
Wysocki et al., Structural polymer electrolyte for use in multifunctional energy storage devices. Proc $14^{th}$ Eur Conf on Compos Mater (ECCM 14). Budapest, Hungary. Jun. 7-10, 2010;2732-8. Paper Id: 043-ECCM14. 8 pages.
Xu et al., In-situ curing of glass fiber reinforced polymer composites via resistive heating of carbon nanotube films. Composites Sci and Technol. 2017;149:20-7.
Yaglioglu et al., Wide range control of microstructure and mechanical properties of carbon nanotube forests: A comparison between fixed and floating catalyst CVD techniques. Adv Funct Mater. 2012. doi:Oct. 1002/adfm.201200852, 10 pages.
Yamamoto et al, High-yield growth and morphology control of aligned carbon nanotubes on ceramic fibers for multifunctional enhancement of structural composites. Carbon 2009;47(3): 551-60.
Yoon et al., KOH activation of carbon nanofibers. Carbon. 2004;42(8-9):1723-9. Epub Apr. 15, 2004.
Zhao et al, A Bone mimic based on the self-assembly of hydroxyapatite on chemically functionalized single-walled carbon nanotubes. Chem. Mater. May 13, 2005; 17(12): 3235-41. doi: 10.1021/cm0500399.
Zhou et al., A closed form solution for flow in dual scale fibrous porous media under constant injection pressure conditions. Compos Sci Technol. 2008;68(3-4):699-708. Epub Sep. 26, 2007.
Zhou et al., Advanced asymmetric supercapacitor based on conducting polymer and aligned carbon nanotubes with controlled nanomorphology. Nano Energy. 2014;9:176-85. Epub Jul. 21, 2014.
Zhu et al., Direct synthesis of long single-walled carbon nanotube strands. Science. May 3, 2002; 296(5569): 884-6. XP-002273566. DOI:10.1126/SCIENCE.1066996.

\* cited by examiner

SEPARATORS COMPRISING ELONGATED NANOSTRUCTURES AND ASSOCIATED DEVICES AND METHODS, INCLUDING DEVICES AND METHODS FOR ENERGY STORAGE AND/OR USE

RELATED APPLICATIONS

This application claims priority under 35 U.S.C. § 119(e) to U.S. Provisional Application No. 62/591,402, filed Nov. 28, 2017, and entitled "Separators Comprising Elongated Nanostructures and Associated Devices and Methods, Including Devices and Methods for Energy Storage and/or Use," which is incorporated herein by reference in its entirety for all purposes.

TECHNICAL FIELD

The use of elongated nanostructures in separators and associated devices and methods, including devices and methods for energy storage and/or use, are generally described.

SUMMARY

The use of elongated nanostructures in separators and associated devices and methods, including devices and methods for energy storage and/or use, are generally described. According to certain embodiments, the elongated nanostructures can extend from a first solid substrate to a second solid substrate. In some embodiments, the nanostructures penetrate a surface of the first solid substrate (e.g., a first electrode) and/or a surface of the second solid substrate (e.g., a second electrode). The elongated nanostructures can, according to certain embodiments, provide structural reinforcement between two substrates (e.g., between two electrodes) while maintaining electronic insulation between the two substrates. In some embodiments, the elongated nanostructures can be ionically conductive. The ionic conductivity of the nanostructures can be used, according to certain embodiments, to shuttle electrochemically active ions between the substrates (which can be electrodes). The subject matter of the present invention involves, in some cases, interrelated products, alternative solutions to a particular problem, and/or a plurality of different uses of one or more systems and/or articles.

Certain aspects are related to inventive articles. In some embodiments, the article comprises a first electronically conductive solid substrate; a second electronically conductive solid substrate; and a plurality of electronically insulating elongated nanostructures extending from the first electronically conductive solid substrate to the second electronically conductive solid substrate. In some embodiments, a region between the first electronically conductive solid substrate and the second electronically conductive solid substrate is electronically insulating such that transport of electrons through the region between the first electronically conductive solid substrate and the second electronically conductive solid substrate is inhibited or prevented; the region between the first electronically conductive solid substrate and the second electronically conductive solid substrate is ionically conductive such that ions can be transported through the region, and at least a portion of the electronically insulating elongated nanostructures penetrate a surface of the first electronically conductive solid substrate and/or a surface of the second electronically conductive solid substrate.

In some embodiments, the article comprises a first electronically conductive solid substrate; a second electronically conductive solid substrate; and an ionically conductive and electronically insulating region between the first electronically conductive solid substrate and the second electronically conductive solid substrate, wherein the ionically conductive region comprises a plurality of electronically insulating elongated nanostructures extending from the first electronically conductive solid substrate to the second electronically conductive solid substrate.

Some aspects are related to inventive methods. In certain embodiments, the method comprises establishing an electric potential between a first electronically conductive solid substrate and a second electronically conductive solid substrate, wherein a plurality of electronically insulating elongated nanostructures extend from the first electronically conductive solid substrate to the second electronically conductive solid substrate; and at least a portion of the electronically insulating elongated nanostructures penetrate a surface of the first electronically conductive solid substrate and/or a surface of the second electronically conductive solid substrate.

In some embodiments, the method comprises establishing an electric potential between a first electronically conductive solid substrate and a second electronically conductive solid substrate, wherein an ionically conductive region between the first electronically conductive solid substrate and the second electronically conductive solid substrate comprises a plurality of electronically insulating elongated nanostructures extending from the first electronically conductive solid substrate to the second electronically conductive solid substrate.

In some embodiments, the method comprises arranging a plurality of electronically insulating elongated nanostructures such that the electronically insulating elongated nanostructures extend from a first electronically conductive solid substrate to a second electronically conductive solid substrate, wherein a region between the first electronically conductive solid substrate and the second electronically conductive solid substrate is electronically insulating such that transport of electrons through the region between the first electronically conductive solid substrate and the second electronically conductive solid substrate is inhibited or prevented; the region between the first electronically conductive solid substrate and the second electronically conductive solid substrate is ionically conductive such that ions can be transported through the region, and at least a portion of the electronically insulating elongated nanostructures penetrate a surface of the first electronically conductive solid substrate and/or a surface of the second electronically conductive solid substrate.

Certain embodiments comprise arranging a plurality of electronically insulating elongated nanostructures such that the electronically insulating elongated nanostructures extend from a first electronically conductive solid substrate to a second electronically conductive solid substrate, wherein a region between the first electronically conductive solid substrate and the second electronically conductive solid substrate is electronically insulating and ionically conductive.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
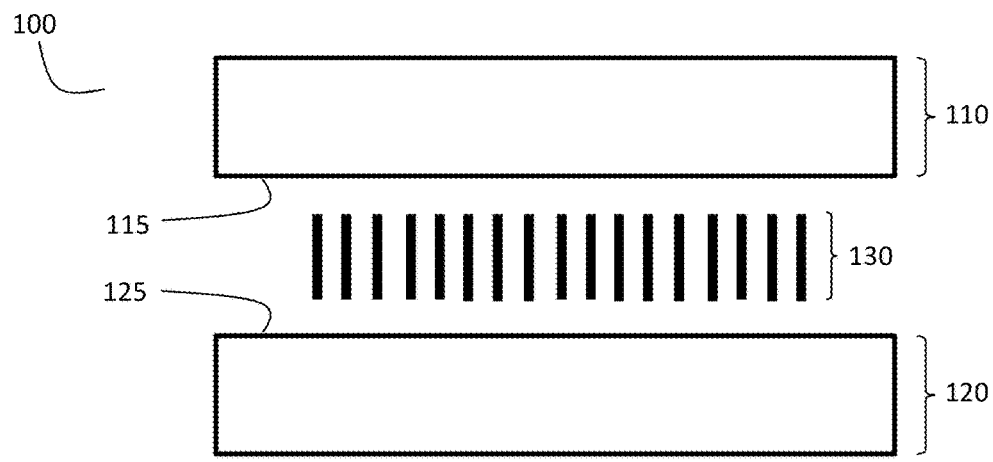
FIG. 1A is, in accordance with certain embodiments, a cross-sectional schematic diagram illustrating an article in which elongated nanostructures are arranged between two substrates, according to certain embodiments.

The use of elongated nanostructures in separators and associated devices and methods, including devices and methods for energy storage and/or use, are generally described. According to certain embodiments, electronically insulating elongated nanostructures, which may optionally also be ionically conductive, are arranged between two electronically conductive substrates. The presence of the electronically insulating elongated nanostructures can, according to certain embodiments, strengthen the interface between the electronically conductive substrates. When ionically conductive elongated nanostructures are employed, the elongated nanostructures can further enhance the degree to which ions (e.g., electrochemically active ions, such as Li⁺ or other electrochemically active ions) are transported between the two electronically conductive substrates.

In some embodiments, the elongated nanostructures penetrate the first and/or the second electronically conductive substrates. According to certain embodiments, penetration of the elongated nanostructures into one or both of the substrates can further enhance the structural reinforcement provided by the elongated nanostructures. In addition, when ionically conductive elongated nanostructures are employed, penetration of the elongated nanostructures into the substrate can aid with the transport of ions (e.g., electrochemically active ions) into the bulk of one or both substrates. This can be particularly advantageous when the substrates are or are part of electrodes, for example, in electrochemical cells (e.g., batteries, electrolytic capacitors such as supercapacitors, and the like) and/or dielectric capacitors.

Certain embodiments relate to the use of elongated nanostructures in articles that employ one or more carbon fiber reinforced polymeric substrates. The use of carbon fiber reinforced polymers (CFRP) as electrodes (e.g., in multifunctional structural supercapacitors) has generally been limited by the relatively low ionic conductivity and/or mechanical properties of the insulator separator. Certain of the embodiments described herein can be used to produce polarized devices (e.g., electrochemical cells, capacitors, etc.) in which elongated nanostructures are used in the separator region to enhance structural reinforcement and/or ionic conductivity. In one embodiment, elongated nanostructures are arranged between two electronically conductive substrates such that the elongated nanostructures penetrate one or both of the substrates. In some such embodiments, the substrates are CFRP substrates, and the penetration of the nanostructures into the CFRP substrates can facilitate the transport of ions to the electronically conductive carbon fibers within the CFRP substrate(s).

As described in more detail below, the elongated nanostructures may be made of a variety of materials. In some embodiments, alumina nanotubes are used as the elongated nanostructures.

As noted above, certain embodiments are related to inventive articles comprising inventive arrangements of elongated nano structures.

According to certain embodiments, the article comprises a first electronically conductive solid substrate and a second electronically conductive solid substrate. As used herein, a "solid substrate" is one in which at least a portion of the substrate is formed from a solid material.

FIG. 1A is a cross-sectional schematic diagram illustrating an article in which elongated nanostructures are arranged between two substrates, according to certain embodiments. As noted above, the article can have a first solid substrate and a second solid substrate. For example, in FIG. 1A, article 100 comprises first solid substrate 110 and second solid substrate 120.

According to certain embodiments, the first and/or second solid substrate(s) are porous. As used herein, a "pore" of an article (e.g., a substrate) refers to a conduit, void, or passageway, at least a portion of which is surrounded by the medium in which the pore is formed such that a continuous loop may be drawn around the pore while remaining within the medium. Voids within a material that are completely surrounded by the material (and thus, not accessible from outside the material, e.g., closed cells) are not considered pores within the context of this disclosure. The "porosity" of an article is expressed as a percentage, and is calculated as follows:

$$\text{Porosity} = \frac{V_p}{V_{article}} \times 100\%$$

where $V_p$ is the volume occupied by the pores of the article and $V_{article}$ is the geometric volume of the article. The geometric volume of an article is calculated by measuring the volume of the article as defined by its geometric surfaces, which are the surfaces of the article that define its outer boundaries (for example, the area that may be measured by a macroscopic measuring tool (e.g., a ruler)).

Those of ordinary skill in the art would be capable of determining the porosity of a particular article using, for example, mercury intrusion porosimetry.

Referring to FIG. 1A, first solid substrate 110 can be porous, according to certain embodiments. In some embodiments, second solid substrate 120 can be porous. In certain cases, it can be advantageous to use a porous substrate as the first and/or second substrates, as doing so can allow one to incorporate other materials (e.g., non-solid materials such as liquid electrolytes, solid materials such as particulate electrode active materials, etc.) into the substrate. In some embodiments, the first solid substrate is non-porous and the second solid substrate is porous. In certain embodiments, the first solid substrate is porous and the second solid substrate is non-porous. In some embodiments, the first solid substrate and the second solid substrate are both porous.

The solid substrates can, according to certain embodiments, have any of a variety of suitable porosities. In some embodiments, the first substrate has a porosity of at least 1 vol %, at least 2 vol %, at least 5 vol %, at least 10 vol %, or at least 25 vol % (and/or up to 50 vol %, up to 75 vol %, up to 90 vol %, up to 95 vol %, or more). Combinations of these ranges are also possible. In some embodiments, the second substrate has a porosity of at least 1 vol %, at least 2 vol %, at least 5 vol %, at least 10 vol %, or at least 25 vol % (and/or up to 50 vol %, up to 75 vol %, up to 90 vol %, up to 95 vol %, or more). Combinations of these ranges are also possible.

As noted above, according to certain embodiments, the first solid substrate and/or the second solid substrate are electronically conductive substrates. Referring to FIG. 1A, first solid substrate 110 can be an electronically conductive solid substrate. Also, second solid substrate 120 can be an electronically conductive solid substrate.

Those of ordinary skill in the art are familiar with electronic conductivity, which refers to the ability of a material to conduct electrons to a substantial degree. Examples of electronically conductive materials include, but are not limited to, conductive carbon materials (e.g., carbon fibers, carbon black, graphite), metals (e.g., copper), conductive polymers, and the like.

In some embodiments, the electronically conductive material has a resistivity (during use and/or at 20° C.) of less than or equal to 0.01 Ωm, less than or equal to 0.001 Ωm, less than or equal to 0.0001 Ωm, less than or equal to 0.00001 Ωm, less than or equal to 0.000001 Ωm, or less than or equal to 0.0000001 Ωm. Accordingly, according to certain embodiments, the first and/or second solid substrates have a resistivity (during use and/or at 20° C.) of less than or equal to 0.01 Ωm, less than or equal to 0.001 Ωm, less than or equal to 0.0001 Ωm, less than or equal to 0.00001 Ωm, less than or equal to 0.000001 Ωm, or less than or equal to 0.0000001 Ωm. In some embodiments, the first and/or second substrates exhibit these electronic conductivities through their thicknesses.

Those of ordinary skill in the art would be capable of determining whether a material is electronically conductive, and quantifying the degree of its electronic conductivity, by making resistance measurements. The resistivity of an article (e.g., a substrate) along a given direction can be determined by measuring the resistance across the article in that direction. Using this resistance measurement, the resistivity can then be back calculated using the geometry across which the resistance was measured. Generally, the resistivity (ρ) of the article is calculated as:

$$\rho = \frac{A \cdot R}{l}$$

where A is the cross-sectional area of the article orthogonal to the length along which the resistance measurement was made, R is the measured resistance value, and l is the length along which the resistance measurement was made.

The first electronically conductive solid substrate and the second electronically substrate can, according to certain embodiments, be made of any of a variety of suitable materials, including electronically conductive materials and composites of electronically conductive materials with electronically insulating materials.

In some embodiments, the solid substrate(s) comprise an electronically conductive material disposed within an electronically insulating support material. Those of ordinary skill in the art are familiar with electronically insulating materials, which are materials that have the ability to restrict the flow of electrons such that electrons are not transported through the material to a substantial degree. Examples of electronically insulating materials include, but are not limited to, insulating polymers, insulating ceramics, insulating glasses, and the like. In some embodiments, the electronically insulating material has a resistivity (during use and/or at 20° C.) of at least 100 Ωm; at least 1000 Ωm; at least 10,000 Ωm; at least 100,000 Ωm; at least 1,000,000 Ωm; at least 10,000,000 Ωm; at least $1\times10^8$ Ωm; at least $1\times10^{10}$ Ωm; at least $1\times10^{12}$ Ωm; at least $1\times10^{14}$ Ωm; at least $1\times10^{16}$ Ωm; at least $1\times10^{18}$ Ωm; at least $1\times10^{20}$ Ωm; at least $1\times10^{22}$ Ωm; or more. Those of ordinary skill in the art would be capable of determining whether a material is electronically insulating, and quantifying the degree of its electronic insulation, by making resistance measurements, as described elsewhere.

In some embodiments, the first and/or second electronically conductive solid substrate is mostly made of an electronically conductive material (e.g., at least 50 vol %, at least 75 vol %, at least 90 vol %, or at least 95 vol % being electronically conductive). In other cases, the first and/or second electronically conductive solid substrate can be a substantial amount of electronically insulating material (e.g., an insulating polymer), with electronically conductive material (e.g., carbon fibers, carbon black, etc.) dispersed within the electronically insulating material to impart electronic conductivity to the substrate. Any combination of electronically conductive materials and electronically insulating materials may be used for the first electronically conductive solid substrate and the second electronically conductive solid substrate disposed within electronically insulating support materials.

In accordance with certain embodiments, the first solid substrate and/or the second solid substrate can have any of a variety of suitable forms. For example, according to certain embodiments, the first electronically conductive solid substrate and/or the second electronically conductive solid substrate comprise polymeric material, silicon, carbon, a ceramic, and/or a metal. Referring to FIG. 1A, for example, first electronically conductive solid substrate 110 and/or second electronically conductive solid substrate 120 can comprise polymeric material, silicon, carbon, a ceramic, and/or a metal.

In certain embodiments, the first solid substrate and/or the second solid substrate comprise one or more fibers embedded in a polymer material. In some embodiments, the first solid substrate and/or the second solid substrate comprise a prepreg. The prepreg can be, according to certain embodiments, electronically conductive. As used herein, the term "prepreg" refers to one or more layers of thermoset or thermoplastic resin containing embedded fibers. The embedded fibers in the prepreg can be, for example, fibers of carbon, metal, glass, and/or silicon carbide. In certain embodiments, the fibers of the prepreg are electronically conductive.

Referring to FIG. 1A, in some embodiments, first solid substrate 110 and/or second solid substrate 120 comprise a prepreg.

According to certain embodiments, the first solid substrate and/or the second solid substrate are or are part of an electrode. For example, in FIG. 1A, first electronically conductive solid substrate 110 and second electronically conductive solid substrate 120 are electrodes. In certain embodiments, the first solid substrate is or is part of an anode and the second electronically conductive solid substrate is or is part of a cathode. In some cases, first electronically conductive solid substrate is or is part of a cathode and second electronically conductive solid substrate is or is part of an anode. As used herein, the term "cathode" (also sometimes referred to as the positive electrode) refers to the electrode from which a conventional current (i.e., the direction in which positive charges move) leaves a polarized electrical device during discharge, and is typically indicated with a "+" sign. As used herein, the "anode" (also sometimes referred to as the negative electrode) is the electrode to which a conventional current flows in a polarized electrical device during discharge, and is typically indicated with a "−" sign. In certain embodiments, the first substrate and the second substrate are electrodes within a polarized device. Non-limiting examples of such polarized devices include, but are not limited to, capacitors and electrochemical cells (e.g., rechargeable and/or non-rechargeable batteries).

According to certain embodiments, the article comprises a plurality of electronically insulating elongated nanostructures. As used herein, the term "nanostructure" refers to an object having at least one cross-sectional dimension of less than 1 micrometer. As used herein, the term "elongated nanostructure" refers to a nanostructure that has an aspect ratio greater than or equal to 10. As shown in FIG. 1A, article 100 comprises a plurality of electronically insulating elongated nanostructures 130.

The plurality of electronically insulating elongated nanostructures can, according to certain embodiments, comprise any of a variety of suitable electronically insulating materials (which, in some embodiments, can also be ionically conductive).

In some embodiments, the electronically insulating elongated nanostructures are primarily made of inorganic materials (e.g., having at least 50 wt %, at least 75 wt %, at least 90 wt %, or at least 95 wt % of their masses made up of inorganic materials). In certain embodiments, the electronically insulating elongated nanostructures are primarily made of non-polymeric materials (e.g., having at least 50 wt %, at least 75 wt %, at least 90 wt %, or at least 95 wt % of their masses made up of materials that are not polymers).

In some embodiments, the plurality of electronically insulating elongated nanostructures comprise crystalline nanostructures. For example, in some embodiments, the plurality of electronically insulating elongated nanostructures comprise crystalline (e.g., monocrystalline and/or polycrystalline) boron nitride nanotubes, crystalline titania nanotubes, and the like. Non-crystalline (e.g., amorphous) elongated nanostructures could also be used.

In certain embodiments, the plurality of electronically insulating elongated nanostructures comprise one or more metal oxides. For example, in certain embodiments, the plurality of electronically insulating elongated nanostructures comprise alumina, titania, $SiO_2$, $ZrO_2$, and/or ZnO. In some embodiments, the plurality of electronically insulating elongated nanostructures comprise boron nitride. According to some embodiments, the plurality of electronically insulating elongated nanostructures comprise carbon-based nanostructures. For example, according to some embodiments, the plurality of electronically insulating elongated nanostructures comprise electronically insulating carbon nanotubes.

Figure 4:
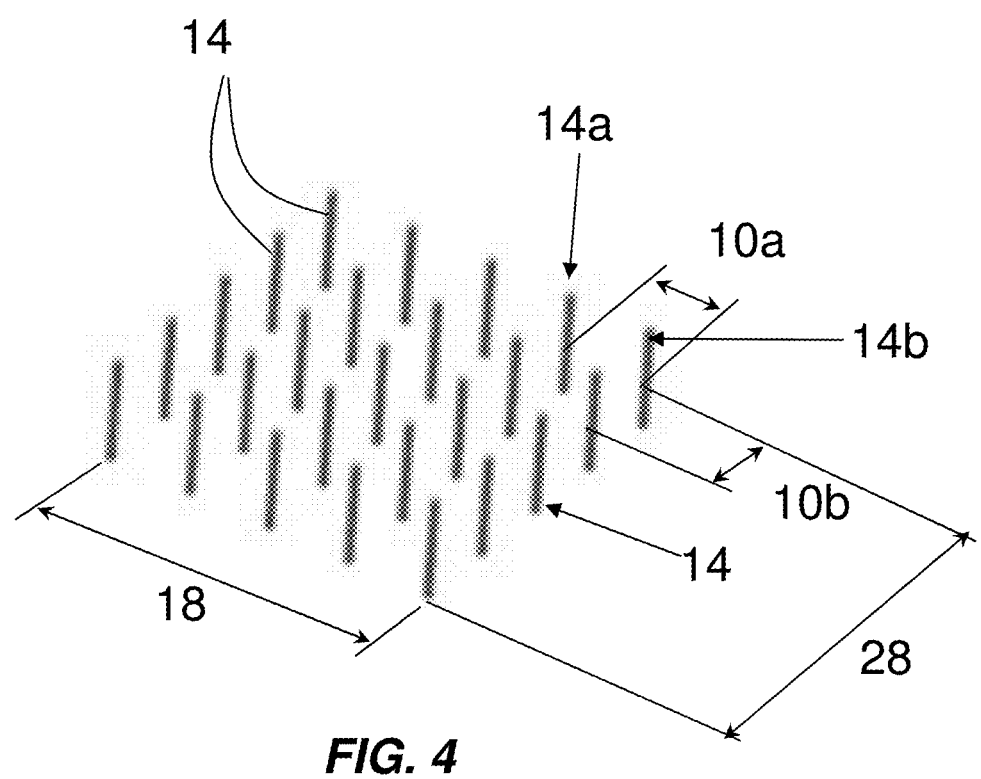
FIG. 4 is a perspective view schematic illustration of a collection of nano structures, according to certain embodiments.

The plurality of electronically insulating elongated nanostructures can, according to certain embodiments, comprise any of a variety of suitable nanostructure forms. In certain embodiments, the plurality of electronically insulating elongated nanostructures comprise nanotubes, nanofibers, and/or nanowires. FIG. 4 is a perspective view schematic illustration of a collection of nanostructures. According to some embodiments and as shown in FIG. 4, the electronically insulating elongated nanostructures are nanotubes. Other suitable nanostructure forms are also possible.

According to some embodiments, the plurality of electronically insulating elongated nanostructures comprise alumina-based nanostructures with any of a variety of suitable nanostructure forms. For example, the plurality of electronically insulating elongated nanostructures comprise alumina nanotubes, alumina nanofibers, and/or alumina nanowires.

Figure 1B:
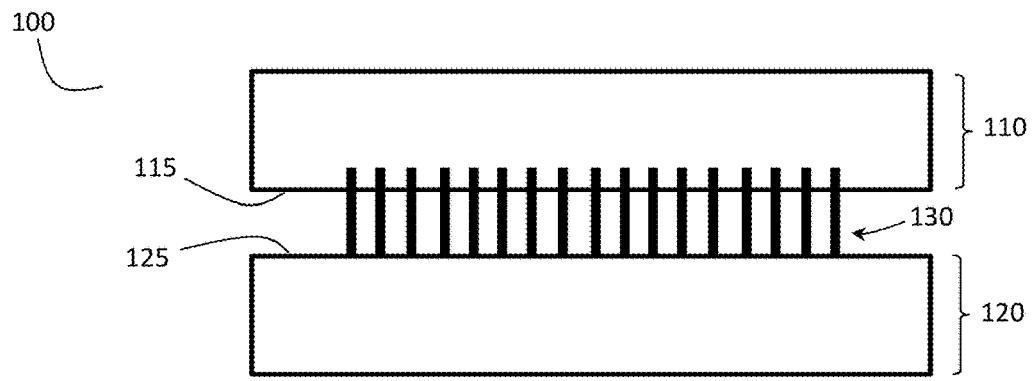
FIG. 1B is, according to some embodiments, a cross-sectional schematic diagram illustrating an article in which a plurality of elongated nanostructures penetrate a first electronically conductive solid substrate.

In some embodiments, the plurality of electronically insulating elongated nanostructures are arranged such that the electronically insulating elongated nanostructures extend from the first solid substrate to the second solid substrate. FIG. 1B is a cross-sectional schematic diagram illustrating an article in which a plurality of elongated nanostructures penetrate a first electronically conductive solid substrate. As shown in FIG. 1B, plurality of electronically insulating elongated nanostructures 130 are arranged such that plurality of electronically insulating elongated nanostructures 130 extend from surface 115 of first solid substrate 110 to surface 125 of second solid substrate 120. According to some embodiments, the electronically insulating elongated nanostructures have long axes that are substantially perpendicular to (e.g., within 10°, within 5°, or within 2° of perpendicular to) the first solid substrate and/or the second solid substrate. In certain embodiments, the electronically insulating elongated nanostructures extending from the first solid substrate to the second solid substrate connect the first solid substrate to the second solid substrate.

According to certain embodiments, the plurality of electronically insulating elongated nanostructures are arranged such that the plurality extends a relatively large distance laterally. This can be achieved, for example, by arranging a large number of the elongated nanostructures in a side-by-side configuration. In some embodiments, the plurality of electronically insulating elongated nanostructures extends a distance at least 10 times (or at least 100 times, or at least 500 times, or at 1,000 times, or at least 5,000, or at least 10,000 times) greater than the average distance between adjacent nanostructures in at least one coordinate direction perpendicular to the long axes of the nanostructures. In some embodiments, the plurality of electronically insulating elongated nanostructures extends a distance at least 10 times (or at least 100 times, or at least 500 times, or at 1,000 times, or at least 5,000, or at least 10,000 times) greater than the average distance between adjacent nanostructures in each of two orthogonal coordinate directions each perpendicular to the long axes. FIG. 4 is a schematic illustration illustrating how one could calculate the degree of lateral extension for a collection of elongated nanostructures. In FIG. 4, the plurality of electronically insulating elongated nanostructures 14 are in a side-by-side configuration such that the collection of nanostructures extends distance 18 laterally along a first coordinate direction that is orthogonal to the long axes of the nanostructures. In addition, In FIG. 4, the plurality of electronically insulating elongated nanostructures 14 are in a side-by-side configuration such that the collection of nanostructures extends distance 28 laterally along a second coordinate direction that is also orthogonal to the long axes of the nanostructures. In FIG. 4, the collection of nanostructures extends a distance that is four (4) times the average spacing 10 between the elongated nanostructures in each of these two coordinate directions (18 and 28). To achieve longer lateral extents, one would add a larger number of nanostructures to the collection.

In some embodiments, the plurality of nanostructures arranged between the first and second substrates comprises at least 10; at least 100; at least 1,000; at least 10,000; at least 100,000; or at least 1,000,000 elongated nanostructures arranged in a side-by-side configuration.

According to certain embodiments, the plurality of electronically insulating elongated nanostructures penetrate a surface of the first electronically conductive solid substrate and/or a surface of the second electronically conductive solid substrate. Generally, nanostructures are said to penetrate a substrate when the nanostructures extend into the geometric volume of the substrate. For example, for a porous substrate, nanostructures that extend into the pores of the substrate are said to penetrate the substrate. For a non-porous substrate, nanostructures that extend into the solid bulk of the substrate are said to penetrate the substrate. In some embodiments, the penetration of the nanostructures into the first and/or second substrate involves the nanostructures penetrating into a solid volume of the substrate a distance of at least 500 nm, at least 1 micrometer, at least 5 micrometers, at least 10 micrometers, at least 50 micrometers, at least 100 micrometers, at least 500 micrometers, or more. For example, in some embodiments, the first and/or second substrate comprises a prepreg comprising electronically conductive carbon fibers arranged in an electrically insulating polymer, and the nanostructures penetrate into the prepreg (e.g., into polymer of the prepreg) a distance of at least 500 nm, at least 1 micrometer, at least 5 micrometers, at least 10 micrometers, at least 50 micrometers, at least 100 micrometers, at least 500 micrometers, or more.

Figure 2A:
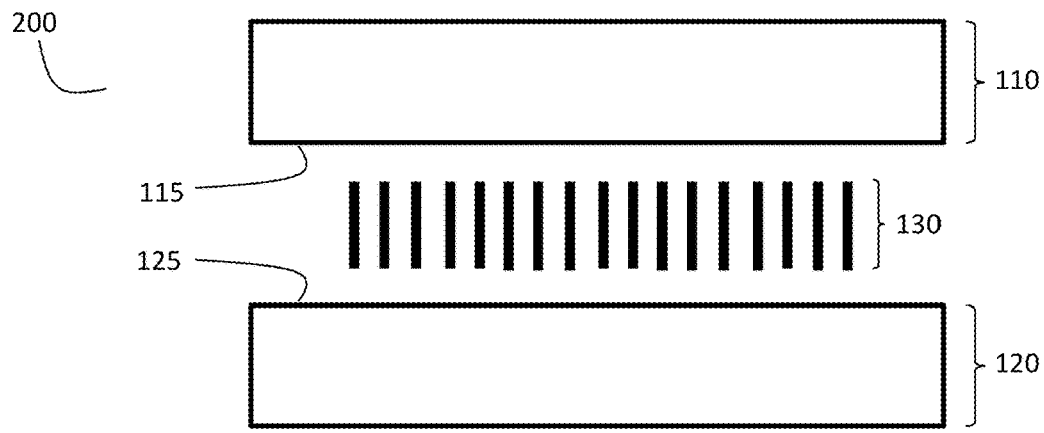
FIG. 2A is, in accordance with certain embodiments, a cross-sectional schematic diagram illustrating an article in which elongated nanostructures are arranged between two substrates, according to certain embodiments.
Figure 2B:
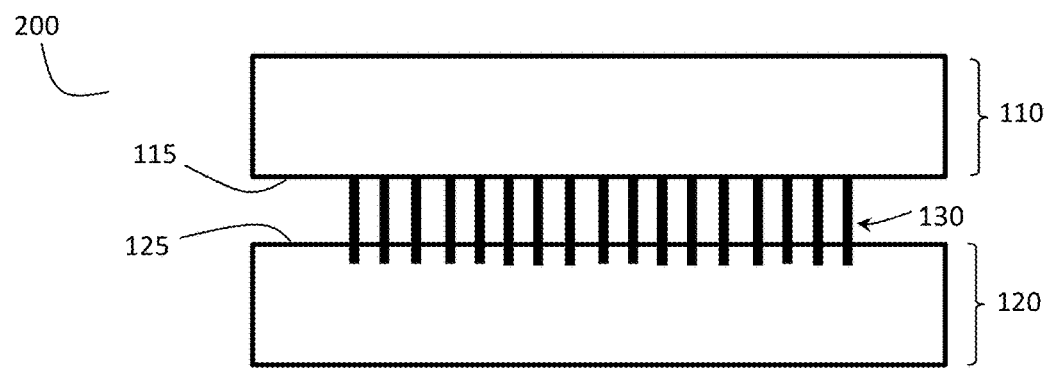
FIG. 2B is, according to some embodiments, a cross-sectional schematic diagram illustrating an article in which a plurality of elongated nanostructures penetrate a second electronically conductive solid substrate.
Figure 3A:
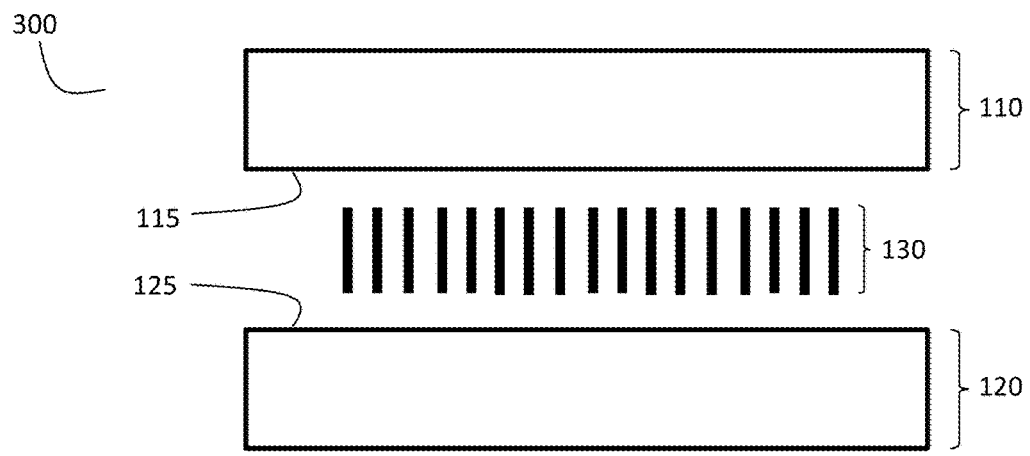
FIG. 3A is, in accordance with certain embodiments, a cross-sectional schematic diagram illustrating an article in which elongated nanostructures are arranged between two substrates, according to certain embodiments.
Figure 3B:
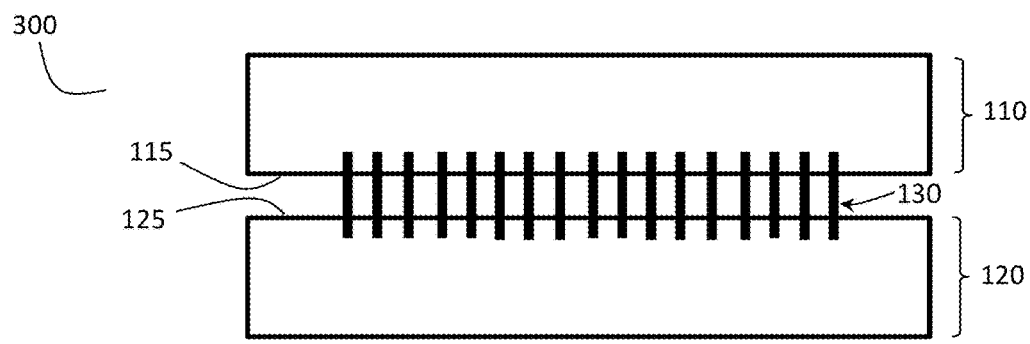
FIG. 3B is, according to some embodiments, a cross-sectional schematic diagram illustrating an article in which a plurality of elongated nanostructures penetrate a first and a second electronically conductive solid substrate.

One example of nanostructure penetration into a substrate is shown in FIG. 1B. In FIG. 1B, elongated nanostructures 130 penetrate surface 115 of first solid substrate 110. FIG. 2B is a cross-sectional schematic diagram illustrating an article in which a plurality of elongated nanostructures penetrate a second electronically conductive solid substrate. Another example of nanostructure penetration into a substrate is shown in FIG. 2B, in which elongated nanostructures 130 penetrate surface 125 of second solid substrate 120. FIG. 3B is a cross-sectional schematic diagram illustrating an article in which a plurality of elongated nanostructures penetrate a first and a second electronically conductive solid substrate. Yet another example of nanostructure penetration into substrates is shown in FIG. 3B, in which elongated nanostructures 130 penetrate both first solid substrate 110 and second solid substrate 120.

In certain embodiments, the plurality of electronically insulating elongated nanostructures penetrates at least a first surface of the solid substrate upon application of force to the plurality of electronically insulating elongated nanostructures and/or softening of the solid substrate. In some cases, the force may be applied over at least a portion of the time during which the solid substrate is softened. In some embodiments, the plurality of elongated nanostructures may be located adjacent the solid substrate and, upon application of one or more forces, the plurality of elongated nanostructures penetrates at least a first surface of the solid substrate.

According to certain embodiments, the elongated nanostructures are ionically conductive (e.g., with respect to an electrochemically active ion, such as $Li^+$). Those of ordinary skill in the art are familiar with ionic conductivity, which refers to the ability of a material to conduct ions to a substantial degree. Those of ordinary skill in the art would be capable of determining whether a material is ionically conductive, and quantifying the degree of its ionic conductivity, by calculating it using impedance data. Using ionically conductive elongated nanostructures can be beneficial, according to certain embodiments, as it may enhance the transport of ions (e.g., electrochemically active ions, such as $Li^+$) through the region between the substrates, which can be useful in enhancing the performance of certain devices (e.g., certain electrochemical cells, capacitors, etc.). According to certain embodiments, the ionic conductivity of an ionically conductive material can be (during use and/or at 20° C.) greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm (and/or, up to 100 S/cm, up to 10 S/cm, up to 1 S/cm, up to $10^{-1}$ S/cm, up to $10^{-2}$ S/cm, up to $10^{-3}$ S/cm, up to $10^{-4}$ S/cm, up to $10^{-5}$ S/cm, up to $10^{-6}$ S/cm, or more) across at least one dimension of the material (e.g., its longest dimension).

According to certain embodiments, the ionic conductivity of the elongated nanostructures (during use and/or at 20° C.) is greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm (and/or, up to 100 S/cm, up to 10 S/cm, up to 1 S/cm, up to $10^{-1}$ S/cm, up to $10^{-2}$ S/cm, up to $10^{-3}$ S/cm, up to $10^{-4}$ S/cm, up to $10^{-5}$ S/cm, up to $10^{-6}$ S/cm, or more) when measured across their lengths. In some embodiments, the ionic conductivity of the elongated nanostructures (during use and/or at 20° C.) is greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm (and/or, up to 100 S/cm, up to 10 S/cm, up to 1 S/cm, up to $10^{-1}$ S/cm, up to $10^{-2}$ S/cm, up to $10^{-3}$ S/cm, up to $10^{-4}$ S/cm, up to $10^{-5}$ S/cm, up to $10^{-6}$ S/cm, or more) when measured from a first end of the nanostructure in or in contact with the first solid substrate to a second end of the nanostructure in or in contact with the second solid substrate.

In certain embodiments, the electronically insulating nanostructure can have diameters (which, for each elongated nanostructure, corresponds to the largest diameter of that nanostructure along its length) falling within certain ranges. According to certain embodiments, the number average of the diameters of the electronically insulating elongated nanostructures is 1 micrometer or less, 500 nm or less, 100 nm or less, 75 nm or less, 50 nm or less, 25 nm or less, or 10 nm or less.

The electronically insulating elongated nanostructures can have any of a variety of average distances between the electronically insulating elongated nano structures. For a plurality of elongated nanostructures, the average distance between those nanostructures is calculated as follows. First, for each nanostructure, the distance between that nanostructure and the closest other nanostructure in the plurality of nanostructures is determined. This distance is referred to as a "nearest neighbor distance." Referring to FIG. 4, for example, nanostructure 14a has nearest neighbor nanostructure 14b, and distance 10a corresponds to the nearest neighbor distance for nanostructure 14a. Once a nearest neighbor distance has been assigned to each nanostructure, the average distance is calculated by taking a number average of the nearest neighbor distances. In FIG. 4, nanostructures 14 are relatively evenly spaced, so the average distance between nanostructures 14 is about the same as distances 10a and 10b. In some embodiments, the average distance between the electronically insulating elongated nanostructures is less than 500 nm, less than 250 nm, less than 100 nm, less than 80 nm, less than 60 nm, less than 40 nm, less than 30 nm, less than 20 nm, less than 10 nm, or less than 5 nm.

According to certain embodiments, the elongated nanostructures can be relatively closely spaced, such that the elongated nanostructures occupy a relatively high volume fraction within the geometric volume of the collection of elongated nanostructures. The "volume fraction" of a collection of elongated nanostructures refers to the percentage of the geometric volume defined by the collection that is occupied by the nanostructures. As nanostructures are spaced closer together within a collection, the volume fraction of the nanostructures will increase. In certain embodiments, the volume fraction of the electronically insulating elongated nanostructures within a geometric volume defined by the electronically insulating elongated nanostructures is at least 1%, at least 2%, at least 5%, at least 10%, at least 25%, at least 50%, at least 75%, at least 85%, or at least 90%.

According to certain embodiments, the electronically insulating elongated nanostructures within the plurality are substantially aligned. Elongated nanostructures within a plurality of elongated nanostructures are said to be substantially aligned with each other when at least 50% of the elongated nanostructures are aligned with their nearest neighbors within the plurality of elongated nanostructures. In some embodiments, at least 50%, at least 60%, at least 70%, at least 80%, or at least 90% of the elongated nanostructures are aligned with their nearest neighbors within the plurality. First and second elongated nanostructures are said to be aligned with each other when, when one traces a first straight line from one end of the first nanostructure to the other end of the first nanostructure, and one traces a second straight line from one end of the second nanostructure to the other end of the second nanostructure, the lines are within 15° (or, in some cases, within 10°, within 5°, or within 2°) of parallel. For example, as illustrated in FIG. 4, elongated nanostructure 14a of the plurality of elongated nanostructures 14 has a nearest neighbor elongated nanostructure 14b. Nanostructure 14a and nanostructure 14b are within 15° of parallel (and are also within 10°, within 5°, and within 2° of parallel), and are therefore aligned with each other. The rest of the nanostructures in FIG. 4 are also aligned with their nearest neighbors. Accordingly, the set of nanostructures illustrated in FIG. 4 are said to be substantially aligned.

Figure 1C:
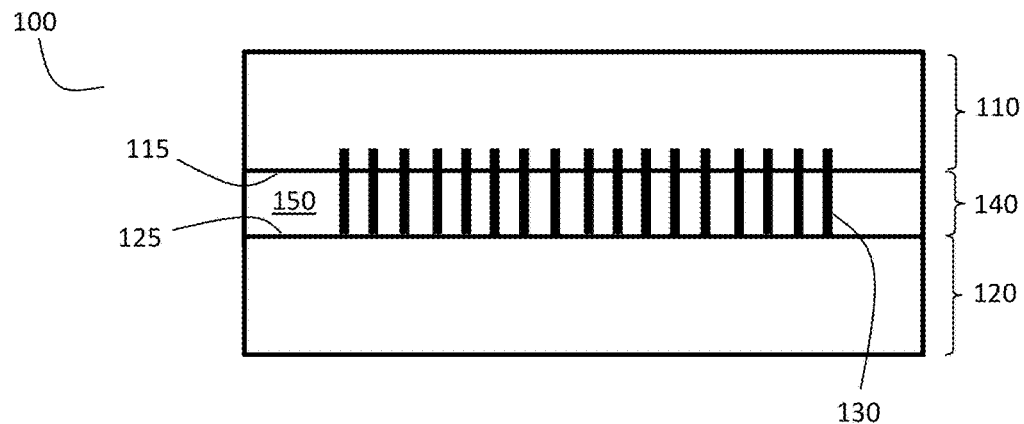
FIG. 1C is, according to certain embodiments, a cross-sectional schematic diagram illustrating an article in which a plurality of elongated nanostructures penetrate the first electronically conductive solid substrate across a separator region.
Figure 2C:
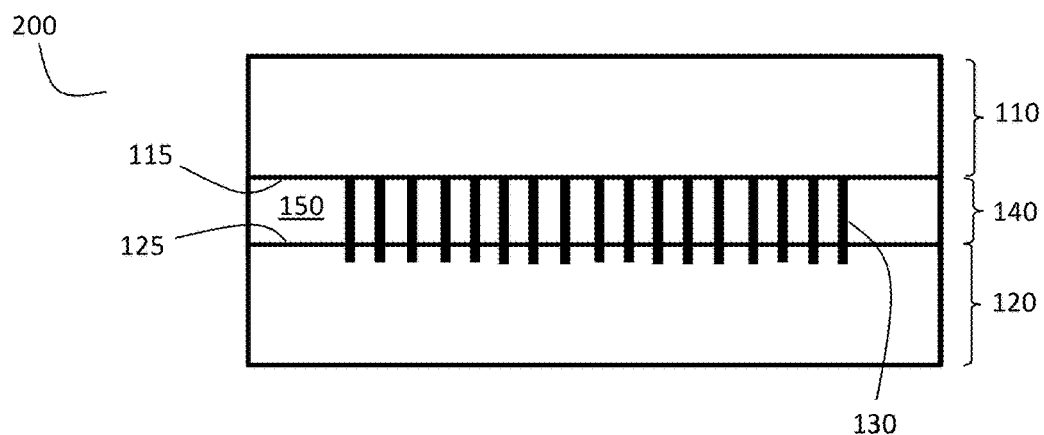
FIG. 2C is, according to certain embodiments, a cross-sectional schematic diagram illustrating an article in which a plurality of elongated nanostructures penetrate the second electronically conductive solid substrate across a separator region.
Figure 3C:
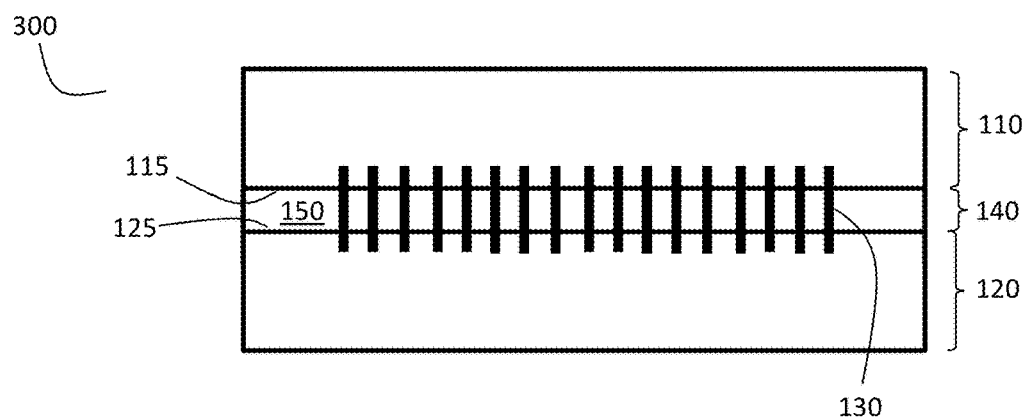
FIG. 3C is, according to certain embodiments, a cross-sectional schematic diagram illustrating an article in which a plurality of elongated nanostructures penetrate the first and second electronically conductive solid substrates across a separator region.

In certain embodiments, the article comprises a region between the first solid substrate and the second solid substrate. The region between the first solid substrate and the second solid substrate can provide a pathway for the transport of ions (e.g., electrochemically active ions) to be shuttled from one substrate to another, according to certain embodiments. FIG. 1C is a cross-sectional schematic diagram illustrating an article in which a plurality of elongated nanostructures penetrate the first electronically conductive solid substrate across a separator region. Referring to FIG. 1C, for example, article 100 includes region 140 between first electronically conductive solid substrate 110 and second electronically conductive solid substrate 120. Region 140 can provide a pathway for the transport of ions between first electronically conductive solid substrate 110 and second electronically conductive solid substrate 120. FIG. 2C is a cross-sectional schematic diagram illustrating an article in which a plurality of elongated nanostructures penetrate the second electronically conductive solid substrate across a separator region. Similarly, in FIG. 2C, article 200 includes region 140 between first electronically conductive solid substrate 110 and second electronically conductive solid substrate 120, which can provide a pathway for the transport of ions between first electronically conductive solid substrate 110 and second electronically conductive solid substrate 120. FIG. 3C is a cross-sectional schematic diagram illustrating an article in which a plurality of elongated nanostructures penetrate the first and second electronically conductive solid substrates across a separator region. In FIG. 3C, article 300 includes region 140 between first electronically conductive solid substrate 110 and second electronically conductive solid substrate 120, which can provide a pathway for the transport of ions between first electronically conductive solid substrate 110 and second electronically conductive solid substrate 120.

According to some embodiments, the region between the first electronically conductive solid substrate and the second electronically conductive solid substrate is electronically insulating (e.g., polymer, alumina, ceramic, and the like), such that transport of electrons through the region between the first electronically conductive solid substrate and the second electronically conductive solid substrate is inhibited or prevented. For example, as shown in FIG. 1C, region 140 between first electronically conductive solid substrate 110 and second electronically conductive solid substrate 120 can be made of an electronically insulating material. In certain embodiments, transport of electrons through region 140 between first between first electronically conductive solid substrate 110 and second electronically conductive solid substrate 120 is prevented. The use of electronically insulating materials between the first and second solid substrates can inhibit or prevent short circuiting between the first and second solid substrates when they are used in polarized devices (e.g., capacitors and/or electrochemical cells).

According to certain embodiments, the region between the first electronically conductive solid substrate and the second electronically conductive solid substrate is ionically conductive. The region between the first solid substrate and the second solid substrate can be configured, according to certain embodiments, such that ions can be transported through the region. For example, referring to FIG. 1C, region 140 between first between first solid substrate 110 and second solid substrate 120 can be ionically conductive such that ions can be transported between first solid substrate 110 and second solid substrate 120.

According to certain embodiments, the ionic conductivity of the region between the first solid substrate and the second solid substrate can be (during use and/or at 20° C.) greater than or equal to $10^{-7}$ S/cm, greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 1 S/cm, or greater than or equal to 10 S/cm (and/or, up to 100 S/cm, up to 10 S/cm, up to 1 S/cm, up to $10^{-1}$ S/cm, up to $10^{-2}$ S/cm, up to $10^{-3}$ S/cm, up to $10^{-4}$ S/cm, up to $10^{-5}$ S/cm, up to $10^{-6}$ S/cm, or more) when measured across the thickness of the region (i.e., from the first substrate to the second substrate).

The region between the first electronically conductive solid substrate and the second electronically conductive substrate may comprise ionically conductive materials. In some embodiments, the region between the first electronically conductive solid substrate and the second electronically conductive solid substrate comprises an electrolyte (e.g., a liquid electrolyte in combination with an electronically insulating separator, a gel electrolyte, and/or a solid electrolyte). For example, referring to FIG. 1C, in some embodiments, region 140 between first electronically conductive solid substrate 110 and second electronically conductive solid substrate 120 can comprise a liquid electrolyte (e.g., NaCl solution) in some embodiments.

According to certain embodiments, the plurality of electronically insulating elongated nanostructures are supported by a support material. Examples of support in which the nanostructures can be distributed include, but are not limited to, monomers, polymers, ceramics, alumina, and the like. Additional details on support materials are described below.

Referring to FIG. 1C, for example, region 140 of article 100 comprises elongated nanostructures 130 disposed in support material 150.

According to certain embodiments, the electronically insulating elongated nanostructures are arranged within an ionically conductive support material.

In some embodiments, the electronically insulating elongated nanostructures are not ionically conductive, and the support material within which the nanostructures are disposed is ionically conductive, imparting ionic conductivity to the region between the first and second solid substrates.

In some embodiments, both the electronically insulating elongated nanostructures and the support material within which the nanostructures are disposed are ionically conductive. In some such embodiments, the presence of the ionically conductive elongated nanostructures enhances the ionic conductivity (e.g., by at least 5%, at least 10%, at least 25%, at least 50%, at least 75%, at least 100%, or more) of the region between the first and second solid substrates, relative to the ionic conductivity that would be exhibited in the absence of the ionically conductive elongated nanostructures but under otherwise identical conditions. Without wishing to be bound by any particular theory, it is believed that this enhancement in ionic conductivity may be due to the disruption of the atomic order (e.g., crystallinity or semi-crystallinity) of the ionically conductive support material by the ionically conductive elongated nanostructures.

Figure 5A:
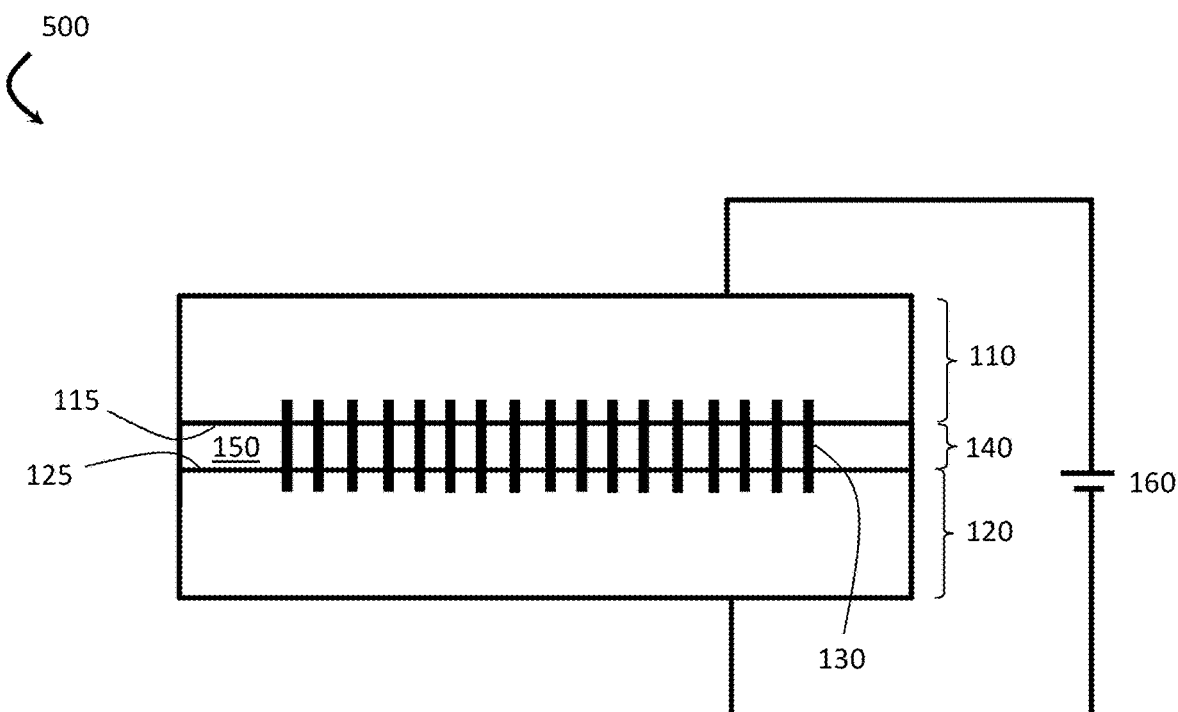
FIG. 5A is an exemplary cross-sectional schematic diagram of an article across which an electric potential has been applied, according to certain embodiments.

Certain aspects are related to methods comprising establishing an electric potential between a first electronically conductive solid substrate and a second electronically conductive solid substrate. Establishing an electrical potential between the first and second solid substrates may be performed, for example, as part of a process of charging a polarized device in which the first and second substrates are disposed (e.g., as electrodes). FIG. 5A is an exemplary cross-sectional schematic diagram of an article across which an electric potential has been applied. Referring to FIG. 5A, for example, in some embodiments, EMF source 160 is used to establish an electric potential between first electronically conductive solid substrate 110 and second electronically conductive solid substrate 120. Because region 140 is electronically insulating, electric charge can accumulate on one of the solid substrates without passing through region 140 to the other substrate.

According to some embodiments, establishing an electric potential between the first electronically conductive solid substrate and the second electronically conductive solid substrate comprises applying a voltage such that an electrochemical reaction occurs. In some embodiments, the voltage application is part of a charging step. For example, referring to FIG. 5A, in some embodiments, article 500 comprises an electrochemical cell. In some such embodiments, when EMF source 160 is applied to article 500, an electrochemical reaction occurs such that the electrochemical cell is recharged.

Figure 5B:
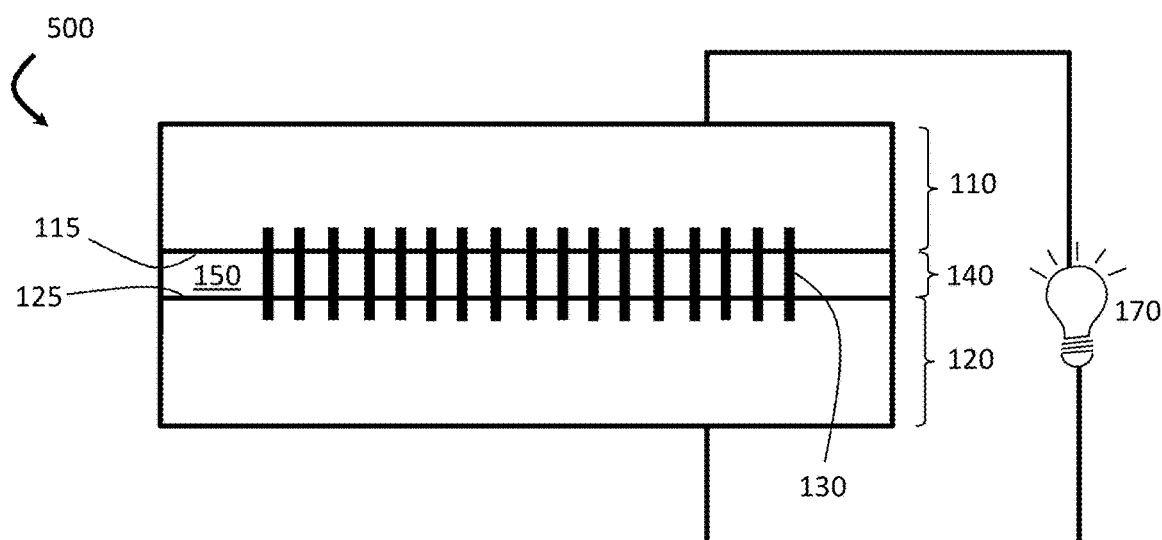
FIG. 5B is an exemplary cross-sectional schematic diagram of an article being used to power an external load, according to some embodiments.

Certain embodiments are related to discharging the electric potential through a load external to the device. FIG. 5B is an exemplary cross-sectional schematic diagram of an article being used to power an external load. For example, referring to FIG. 5B, external electrical load 170 can be electronically coupled to device 500 such that an electric potential is discharged, passing electric current through external electrical load 170.

Certain of the articles described herein can be part of polarized devices. In some embodiments, the first electronically conductive solid substrate and the second electronically conductive solid substrate are part of a capacitor. In some such embodiments, the capacitor is a supercapacitor. In some embodiments, the first electronically conductive solid substrate and the second electronically conductive solid substrate are part of an electrochemical cell. According to some such embodiments, the electrochemical cell is a rechargeable battery or a non-rechargeable battery.

In certain embodiments, the articles described herein have relatively high short beam shear strengths. The articles described herein may have, according to certain embodiments, a short beam shear strength of at least 80 MPa, at least 85 MPa, at least 90 MPa, at least 100 MPa, at least 110 MPa, or at least 120 MPa (and/or up to 150 MPa, up to 175 MPa, up to 200 MPa, or more). Combinations of these ranges are also possible. The short beam shear strength may be determined by using a short beam shear apparatus according to ASTM Test Method D2344M-16.

In some embodiments, the articles described herein have a relatively high flexural modulus. For example, in some embodiments, the articles described herein may have a flexural modulus of at least 1 GPa, at least 5 GPa, at least 10 GPa, at least 15 GPa, at least 20 GPa, or at least 25 GPa (and/or up to 30 GPA, up to 40 GPa, up to 50 GPa, or more). Combinations of these ranges are also possible. The flexural modulus may be determined by using a short beam shear apparatus according to ASTM Test Method D2344M-16.

According to certain embodiments, the articles described herein have a relatively high specific capacitance. The articles described herein may have, according to some embodiments, a specific capacitance of at least 1 mF cm$^{-2}$, at least 2 mF cm$^{-2}$, at least 3 mF cm$^{-2}$, at least 4 mF cm$^{-2}$, at least 5 mF cm$^{-2}$, or at least 6 mF cm$^{-2}$ (and/or up to 7 mF cm$^{-2}$, up to 8 mF cm$^{-2}$, up to 9 mF cm$^{-2}$, up to 10 mF cm$^{-2}$, or more). Combinations of these ranges are also possible. The specific capacitance may be determined from cyclic voltammetry (CV) measurements obtained using an electrochemical work station (e.g., a potentiostat).

According to some embodiments, the substrate (e.g., on which the plurality of electronically insulating elongated nanostructures are supported) is a polymeric substrate. Generally, polymers are materials comprising three or more repeating mer units in their chemical structure. Polymers may comprise additional repeating units and may have any molecular weight. In some embodiments, the substrate may comprise polymers that are in the form of fibers, or may comprise polymeric fibers.

In some embodiments, the polymer of the substrate has a number average molecular weight of greater than or equal to 1,000 Da, greater than or equal to 5,000 Da, greater than or equal to 10,000 Da, greater than or equal to 25,000 Da, greater than or equal to 50,000 Da, greater than or equal to 100,000 Da, or greater than or equal to 500,000 Da. The polymer in the substrate may have a number average molecular weight less than or equal to 1,000,000 Da, less than or equal to 500,000 Da, less than or equal to 100,000 Da, less than or equal to 50,000 Da, less than or equal to 25,000 Da, less than or equal to 10,000 Da, or less than or equal to 5,000 Da. Combinations of the above-referenced ranges are also possible (e.g., greater than or equal to 10,000 Da and less than or equal to 50,000 Da). Other ranges are also possible.

In certain embodiments, the polymer of the substrate has a weight average molecular weight of greater than or equal to 1,000 Da, greater than or equal to 5,000 Da, greater than or equal to 10,000 Da, greater than or equal to 25,000 Da, greater than or equal to 50,000 Da, greater than or equal to 100,000 Da, or greater than or equal to 500,000 Da. The polymer in the substrate may have a weight average molecular weight less than or equal to 1,000,000 Da, less than or equal to 500,000 Da, less than or equal to 100,000 Da, less than or equal to 50,000 Da, less than or equal to 25,000 Da, less than or equal to 10,000 Da, or less than or equal to 5,000 Da. Combinations of the above-referenced ranges are also possible (e.g., greater than or equal to 10,000 Da and less than or equal to 50,000 Da). Other ranges are also possible.

The polymer in the substrate may have any chain structure in accordance with certain embodiments. In some embodiments, polymers may be linear, branched, and/or crosslinked molecules. Or they may be in the form of a crosslinked network. Polymers may have branches or crosslinks of any molecular weight, functionality, and/or spacing. In accordance with some embodiments, the polymers may be highly monodisperse. In accordance with other embodiments, the polymers may be polydisperse. One of ordinary skill in the art would be aware of methods for dispersity. For example, dispersity can be assessed by size-exclusion chromatography.

Polymeric substrates may have any desired mechanical property. In certain embodiments, polymeric substrates are rubbery, glassy, and/or semicrystalline.

In some embodiments, the polymers can be homopolymers, blends of polymers, and/or copolymers. Copolymers may be random copolymers, tapered copolymers, and block copolymers. In certain embodiments, block copolymers with more than three blocks may comprise two or more blocks formed from the same monomer. Blends of polymers can be phase separated or single phase, according to some embodiments.

In some embodiments, polymers may be organic polymers, inorganic polymers, or organometallic polymers. It may be advantageous, according to certain but not necessarily all embodiments, for the substrate to comprise an organic polymer material. In such embodiments, at least 50%, at least 75%, at least 90%, at least 95%, or at least 99%, or 100% of the polymeric substrate is made up of organic polymer material. In certain embodiments, polymers are of synthetic origin. Polymers of synthetic origin may be formed by either step growth or chain growth processes, and may be further functionalized after polymerization. Non-limiting examples of suitable polymers include polystyrene, polyethylene, polypropylene, poly(methyl methacrylate), polyacrylonitrile, polybutadiene, polyisoprene, poly(dimethyl siloxane), poly(vinyl chloride), poly(tetrafluoroethylene), polychloroprene, poly(vinyl alcohol), poly(ethylene oxide), polycarbonate, polyester, polyamide, polyimide, polyurethane, poly(ethylene terephthalate), polymerized phenol-formaldehyde resin, polymerized epoxy resin, para-amid fibers, silk, collagen, keratin, and gelatin. Additional examples of suitable polymers that can be used in the growth substrate include, but are not limited to, relatively high temperature fluoropolymers (e.g., Teflon®), polyetherether ketone (PEEK), and polyether ketone (PEK). In some embodiments, the polymer is not a polyelectrolyte.

In some embodiments, polymeric substrates my further comprise additives. Polymeric substrates may be in the form of a gel and comprise solvent, according to certain embodiments. In some embodiments, polymeric substrates may comprise one or more of fillers, additives, plasticizers, small molecules, and particles comprising ceramic and/or metal. In certain embodiments, greater than or equal to 50%, greater than or equal to 80%, greater than or equal to 90%, greater than or equal to 95%, or greater than or equal to 99% of the mass of the polymeric substrate may comprise polymers. Other ranges are also possible.

In accordance with certain embodiments, the substrate (e.g., on which the plurality of electronically insulating elongated nanostructures are supported) comprises a fiber. For example, in some embodiments, the plurality of electronically insulating elongated nanostructures are supported on a carbon fiber-based substrate. The carbon fibers may be arranged, for example, in a woven or non-woven (e.g., non-woven bundle) configuration. In accordance with some embodiments, the plurality of electronically insulating elongated nanostructures are supported on fibers comprising one or more of the following materials: carbon; carbon glass; glass; alumina; basalt; metals (e.g., steel, aluminum, titanium); aramid (e.g., Kevlar®, meta-aramids such as Nomex®, p-aramids); liquid crystalline polyester; poly(p-phenylene-2,6-benzobisoxazole) (PBO); polyethylene (e.g., Spectra®); poly{2,6-diimidazo[4,5-b:4',5'-e]pyridinylene-1, 4-(2,5-dihydroxy)phenylene}; and combinations of these. In some embodiments, the plurality of electronically insulating elongated nanostructures are supported on fibers comprising at least one of polyetherether ketone (PEEK) and polyether ketone (PEK).

In some embodiments, the substrate may comprise carbon (e.g., amorphous carbon, carbon aerogel, carbon fiber, graphite, glassy carbon, carbon-carbon composite, graphene, and the like).

As noted above, in some embodiments, the plurality of electronically insulating elongated nanostructures are supported on a carbon fiber (e.g., a sized carbon fiber or an unsized carbon fiber). Any suitable type of carbon fiber can be employed including, for example, aerospace-grade carbon fibers, auto/sport grade carbon fibers, and/or microstructure carbon fibers. In certain embodiments, intermediate modulus (IM) or high modulus (HM) carbon fibers can be employed. In some embodiments, poly(acrylonitrile)-derived carbon fibers can be employed. Certain embodiments are advantageous for use with carbon fibers that carry a large degree of their tensile strengths in their outer skins (e.g., fibers in which at least 50%, at least 75%, or at least 90% of the tensile strength is imparted by the portion of the fiber located a distance away from the outer skin of the fiber of less than 0.1 times or less than 0.05 times the cross-sectional diameter of the fiber), such as aerospace grade intermediate modulus carbon fibers.

In certain embodiments, the substrate can be a carbon-based substrate. In some embodiments, the carbon-based growth substrate contains carbon in an amount of at least 75 wt %, at least 90 wt %, at least 95 wt %, or at least 99 wt %. That is to say, in some embodiments, at least 75 wt %, at least 90 wt %, at least 95 wt %, or at least 99 wt % of the carbon-based growth substrate is made of carbon.

According to certain embodiments, the substrate can be a prepreg. A prepreg may include one or more layers of thermoset or thermoplastic resin containing embedded fibers. In some embodiments, the thermoset material includes epoxy, rubber strengthened epoxy, BMI, PMK-15, polyesters, and/or vinylesters. In certain embodiments, the thermoplastic material includes polyamides, polyimides, polyarylene sulfide, polyetherimide, polyesterimides, polyarylenes, polysulfones, polyethersulfones, polyphenylene sulfide, polyetherimide, polypropylene, polyolefins, polyketones, polyetherketones, polyetherketoneketone, polyetheretherketones, and/or polyester. According to certain embodiments, the prepreg includes fibers that are aligned and/or interlaced (woven or braided). In some embodiments, the prepregs are arranged such the fibers of many layers are not aligned with fibers of other layers, the arrangement being dictated by directional stiffness requirements of the article to be formed. In certain embodiments, the fibers cannot be stretched appreciably longitudinally, and thus, each layer cannot be stretched appreciably in the direction along which its fibers are arranged. Exemplary prepregs include thin-ply prepregs, non-crimp fabric prepregs, TORLON thermoplastic laminate, PEEK (polyether etherketone, Imperial Chemical Industries, PLC, England), PEKK (polyetherketone ketone, DuPont) thermoplastic, T800H/3900 2 thermoset from Toray (Japan), and AS4/3501 6 thermoset from Hercules (Magna, Utah), IMA from Hexcel (Magna, Utah), IM7/M21 from Hexcel (Magna, Utah), IM7/977-3 from Hexcel (Magna, Utah), Cycom 5320-1 from Cytec (Woodland Park. N.J.), and AS4/3501 6 thermoset from Hexcel (Magna, Utah).

As described herein, certain embodiments comprise use of one or more support materials. The support materials may provide mechanical, chemical, or otherwise stabilizing support for the plurality of electronically insulating elongated nanostructures. In some cases, the support material may be processed to support the plurality of electronically insulating elongated nanostructures. For example, a mixture of monomeric species may be added to the plurality of electronically insulating elongated nanostructures, and subsequent polymerization of the monomeric species may produce a polymer matrix comprising the plurality of electronically insulating elongated nanostructures disposed therein. As another example, a solgel can be applied to a collection of a plurality of electronically insulating elongated nanostructures and processed to form a ceramic material between the plurality of electronically insulating elongated nanostructures. In some embodiments, gas phase infiltration can be used to form carbonaceous material or silicon carbide between the plurality of electronically insulating elongated nanostructures. Gas-phase infiltration may be executed by various processes such as chemical vapor deposition including decomposition of hydrocarbons. Examples of suitable support materials are described in detail below.

The support material may be a monomer material, a polymer material (e.g., an organic polymer material), a ceramic material, or combinations thereof. In certain embodiments, the support material may be at least partially amorphous. According to some embodiments, for example, the plurality of electronically insulating elongated nanostructures contained in the article may at least partially inhibit molecular relaxation of the support material during a phase transition. In some such embodiments, an article comprising the support material may have a lower crystallinity, melting temperature, and/or enthalpy as compared to either the support material alone (e.g., an organic polymer material) or a theoretical article that does not include the plurality of electronically insulating elongated nanostructures but is otherwise equivalent. The crystallinity of the support material may be measured, in some embodiments, by X-ray powder diffraction (XRD). In certain embodiments, XRD data to determine crystallinity may be supplemented by differential scanning calorimetry (DSC) in order to measure the enthalpy.

Polymer materials for use as binding materials and/or support materials, as described herein, may be any material compatible with a plurality of electronically insulating elongated nanostructures. For example, the polymer material may be selected to uniformly "wet" the plurality of electronically insulating elongated nanostructures and/or to bind one or more substrates. In some cases, the polymer material may be selected to have a particular viscosity, such as 50,000 cPs or lower; 10,000 cPs or lower; 5,000 cPs or lower; 1,000 cPs or lower; 500 cPs or lower; 250 cPs or lower; or 100 cPs or lower. In some embodiments, the polymer material may be selected to have a viscosity between 150-250 cPs.

In some cases, the support material may comprise a thermoset or thermoplastic. Non-limiting examples of thermosets include Microchem SU-8 (UV curing epoxy, grades from 2000.1 to 2100, and viscosities ranging from 3 cPs to 10,000 cPs), Buehler Epothin (low viscosity, about 150 cPs, room temperature curing epoxy), West Systems 206+109 Hardener (low viscosity, ~200 cPs, room temperature curing epoxy), Loctite Hysol 1C (20-min curing conductive epoxy, viscosity 200,000-500,000 cPs), Hexcel RTM6 (resin transfer molding epoxy, viscosity during process ~10 cPs), Hexcel HexFlow VRM 34 (structural VARTM or vacuum assisted resin transfer molding epoxy, viscosity during process ~500 cPs). Non-limiting examples of thermoplastics include polystyrene, or Microchem PMMA (UV curing thermoplastic, grades ranging from 10 cPs to ~1,000 cPs). In one embodiment, the polymer support material may be PMMA, EpoThin, WestSystems EPON, M21 resin, Cycom 5320, 8552 resin, RTM6, VRM34, 977-3, SU8, or Hysol1C.

The support material (or a precursor thereof) may be transported between plurality of electronically insulating elongated nanostructures via any method known to those of ordinary skill in the art. In some embodiments, the support material may be transported between the elongated nanostructures via capillary forces. In other embodiments, the support material or precursor thereof may be transported between the elongated nanostructures by pressure driven flow, molding, or any other known technique.

The support material may be hardened using any suitable method. In some embodiments in which epoxy is used as a support material, the epoxy may be cured, for example, by allowing the precursor material to set, or optionally by applying heat. In some embodiments, hardening may comprise the polymerization of the support material precursor. In some embodiments, hardening the support material may comprise cooling the support material such that it changes phase from a liquid to a solid (i.e., "freezes") or becomes less compliant.

According to certain embodiments, the nanostructures described herein have at least one cross-sectional dimension of less than 500 nm, less than 250 nm, less than 100 nm, less than 75 nm, less than 50 nm, less than 25 nm, less than 10 nm, or, in some cases, less than 1 nm.

In some embodiments, the elongated nanostructure can have an aspect ratio greater than or equal to 100, greater than or equal to 1000, greater than or equal to 10,000, or greater. Those skilled in the art would understand that the aspect ratio of a given structure is measured along the long axis of the elongated nanostructure, and is expressed as the ratio of the length of the long axis of the nanostructure to the maximum cross-sectional diameter of the nanostructure. The "long axis" of an article corresponds to the imaginary line that connects the geometric centers of the cross-sections of the article as a pathway is traced, along the longest length of the article, from one end to another.

The elongated nanostructures can have a cylindrical or pseudo-cylindrical shape, in some embodiments. In some embodiments, the elongated nanostructure can be a nanotube, such as a carbon nanotube. Other examples of elongated nanostructures include, but are not limited to, nanofibers and nanowires.

Elongated nanostructures can be single molecules (e.g., in the case of some nanotubes) or can include multiple molecules bound to each other (e.g., in the case of some nanofibers).

As used herein, the term "nanotube" refers to a substantially cylindrical, hollow elongated nanostructure. The nanotube can comprise a fused network of primarily six-membered rings (e.g., six-membered aromatic rings). Nanotubes may include, in some embodiments, a fused network of at least 10, at least 100, at least 1000, at least $10^5$, at least $10^6$, at least $10^7$, or at least $10^8$ fused rings (e.g., six-membered rings such as six-membered aromatic rings), or more. In some cases, nanotubes may resemble a sheet of graphite formed into a seamless cylindrical structure. It should be understood that the nanotube may also comprise rings or lattice structures other than six-membered rings. According to certain embodiments, at least one end of the nanotube may be capped, i.e., with a curved or nonplanar aromatic group.

Elongated nanostructures may be formed of a variety of materials, in some embodiments. Non-limiting examples of materials from which elongated nanostructures may be formed include silicon, indium-gallium-arsenide materials, silicon nitride (e.g., $Si_3N_4$), silicon carbide, dichalcogenides ($WS_2$), oxides (e.g., molybdenum trioxide), and boron-carbon-nitrogen compounds (e.g., $BC_2N_2$, $BC_4N$). In some embodiments, the elongated nanostructure may be formed of one or more inorganic materials. Non-limiting examples include semiconductor nanowires such as silicon (Si) nanowires, indium-gallium-arsenide (InGaAs) nanowires, and nanotubes comprising, silicon nitride ($Si_3N_4$), silicon carbide (SiC), dichalcogenides such as ($WS_2$), oxides such as molybdenum trioxide ($MoO_3$), and boron-carbon-nitrogen compositions such as $BC_2N_2$ and $BC_4N$. In some embodiments, $SiO_2$, $Al_2O_3$, $TiO_2$, MgO, $Mg_2SiO_4$ $MoS_2$, and/or ZnS nanotubes could be used.

In some embodiments, the elongated nanostructures described herein may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. In some cases, carbon nanotubes may include a wall that comprises fine-grained $sp^2$ sheets. In certain embodiments, carbon nanotubes may have turbostratic walls. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. In some embodiments, the carbon nanotubes are single-walled carbon nanotubes (SWNTs). According to certain although not necessarily all embodiments, it can be advantageous to use insulating and/or semiconducting carbon nanotubes.

According to certain embodiments, the plurality of elongated nanostructures arranged between the first and second substrates are arranged in a forest. As used herein, a "forest" of elongated nanostructures corresponds to a plurality of substantially aligned electronically insulating elongated nanostructures arranged in side-by-side fashion with one another. In some embodiments, the forest is a "self-supporting forest," which is a forest of elongated nanostructures that moves together as a whole when handled. In some embodiments, the forest of electronically insulating elongated nanostructures comprises at least 5, at least 10, at least 50, at least 100, at least 500, at least 1000, or at least 10,000 elongated nanostructures. In some such embodiments, the forest of electronically insulating elongated nanostructures may comprise at least $10^6$, at least $10^7$, at least $10^8$, at least $10^9$, at least $10^{10}$, at least $10^{11}$, at least $10^{12}$, or at least $10^{13}$ electronically insulating elongated nanostructures. Those of ordinary skill in the art are familiar with suitable methods for forming forests of elongated nanostructures. For example, in some embodiments, the forest of electronically insulating elongated nanostructures can be catalytically grown (e.g., using a growth catalyst deposited via chemical vapor deposition process). In some embodiments, the as-grown forest can be used as is, while in other cases, the as-grown forest may be mechanically manipulated after growth and prior to subsequent processing steps described elsewhere herein (e.g., folding, shearing, compressing, buckling, etc.).

In some embodiments in which the nanostructures are on a substrate, the set of substantially aligned electronically insulating elongated nanostructures may be oriented such that the long axes of the electronically insulating elongated nanostructures are substantially non-parallel to the surface of the substrate. In some cases, the long axes of the nanostructures are oriented in a substantially perpendicular direction with respect to the surface of the substrate. As described more fully below, an advantageous feature of some embodiments of the invention may be that the alignment of nanostructures in the nanostructure forest may be substantially maintained, even upon subsequent processing (e.g., application of a force to the forest and/or combining the forests with secondary materials such as polymers, metals, ceramics, piezoelectric materials, piezomagnetic materials, carbon, and/or fluids, among other materials).

Systems and methods for growing elongated nanostructures (including forests of elongated nanostructures) are described, for example, in International Patent Application Serial No. PCT/US2007/011914, filed May 18, 2007, entitled "Continuous Process for the Production of Nanostructures Including Nanotubes," published as WO 2007/136755 on Nov. 29, 2007; U.S. patent application Ser. No. 12/227,516, filed Nov. 19, 2008, entitled "Continuous Process for the Production of Nanostructures Including Nanotubes," published as US 2009/0311166 on Dec. 17, 2009; International Patent Application Serial No. PCT/US07/11913, filed May 18, 2007, entitled "Nanostructure-reinforced Composite Articles and Methods," published as WO 2008/054541 on May 8, 2008; International Patent Application Serial No. PCT/US2008/009996, filed Aug. 22, 2008, entitled "Nanostructure-reinforced Composite Articles and Methods," published as WO 2009/029218 on Mar. 5, 2009; U.S. patent application Ser. No. 11/895,621, filed Aug. 24, 2007, entitled "Nanostructure-Reinforced Composite Articles and Methods," published as US 2008/0075954 on Mar. 27, 2008, and U.S. Patent Publication No. 2010/0196695, published on Aug. 5, 2010, and filed as application Ser. No. 12/618,203 on Nov. 13, 2009; each of which is incorporated herein by reference in its entirety for all purposes.

As noted above, for a given elongated nanostructure in a forest of elongated nanostructures, each elongated nanostructure has a nearest neighbor (and an associated nearest neighbor distance). In certain embodiments, the forest of elongated nanostructures has a number average of nearest neighbor distances that is less than 2.5%, less than 1%, less than 0.5%, less than 0.25%, less than 0.1%, or less than 0.05% of the average length of the elongated nanostructures within the forest.

In some embodiments, the nearest neighbor distance within the forest is roughly equal for each nanostructure. For example, in some embodiments, the standard deviation of the nearest neighbor distances of the nanostructures within the plurality of nanostructures is less than 100%, less than 50%, less than 25%, or less than 10% of the average distance between the elongated nanostructures within the plurality.

In some cases, the nanostructures are dispersed substantially uniformly within the hardened support material. For example, the nanostructures may be dispersed substantially uniformly within at least 10% of the hardened support material, or, in some cases, at least 20%, 30%, 40%, 50%, 60%, 70%, 80%, 90%, 95%, or 100% of the hardened support material. As used herein, "dispersed uniformly within at least X % of the hardened support material" refers to the substantially uniform arrangement of nanostructures within at least X % of the volume of the hardened support material. The ability to arrange nanostructures essentially uniformly throughout structures comprising plurality of fibers allows for the enhanced mechanical strength of the overall structure.

Certain embodiments comprise growing elongated nanostructures. For example, in some embodiments, the elongated nanostructures can be grown on a growth substrate and subsequently transferred to a separate substrate that serves as the first and/or second electronically conductive substrate. In other embodiments, the elongated nanostructures can be grown directly on the first and/or second electronically conductive substrate.

According to some embodiments, the nanostructures can be grown by providing an active growth material (e.g., a catalyst) or an active growth material precursor (e.g., a catalyst precursor) and exposing a precursor of the nanostructures to the active growth material or active growth material precursor. In some embodiments, elongated nanostructures can be grown by exposing the active growth material and the precursor of the carbon-based nanostructures to a set of conditions that causes growth of nanostructures on the active growth material. Growth of the nanostructures may comprise, for example, heating the precursor of the nanostructures, the active growth material, or both. Other examples of suitable conditions under which the nanostructures may be grown are described in more detail below. In some embodiments, growing nanostructures comprises performing chemical vapor deposition (CVD) of nanostructures on the active growth material. In some embodiments, the chemical vapor deposition process may comprise a plasma chemical vapor deposition process. Chemical vapor deposition is a process known to those of ordinary skill in the art, and is explained, for example, in Dresselhaus M S, Dresselhaus G., and Avouris, P. eds. "Carbon Nanotubes: Synthesis, Structure, Properties, and Applications" (2001) Springer, which is incorporated herein by reference in its entirety. Examples of suitable nanostructure fabrication techniques are discussed in more detail in International Patent Application Serial No. PCT/US2007/011914, filed May 18, 2007, entitled "Continuous Process for the Production of Nanostructures Including Nanotubes," published as WO 2007/136755 on Nov. 29, 2007, which is incorporated herein by reference in its entirety.

As noted above, according to certain embodiments, nanostructures can be grown by exposing the nanostructure precursor to an active growth material. As used herein, the term "active growth material" refers to a material that, when exposed to a set of conditions selected to cause growth of nanostructures, either enables growth of nanostructures that would otherwise not occur in the absence of the active growth material under essentially identical conditions, or increases the rate of growth of nanostructures relative to the rate that would be observed under essentially identical conditions but without the active growth material. "Essentially identical conditions," in this context, means conditions that are similar or identical (e.g., pressure, temperature, composition and concentration of species in the environment, etc.), other than the presence of the active growth material. In some embodiments, the active growth material can be part of a larger material (e.g., when the active growth material corresponds to a doped portion of a structure doped with an active material such as an alkali or alkaline earth metal the like). In other cases, the active growth material can be a single, standalone structure (e.g., when the active growth material is a particle comprising at least two components that are capable of forming a eutectic composition with each other, when the active growth material is a particle comprising at least a first type of cation, at least a second type of cation different from the first type of cation, and an anion, etc.). In certain embodiments, the active growth material is active throughout its exposed surface. In some embodiments, the active growth material is active throughout at least some or all of its volume.

In accordance with certain embodiments, the active growth material is not incorporated into the carbon-based nanostructures during growth. For example, the active growth material, according to certain embodiments, is not covalently bonded to the nanostructure grown from the precursor. In some embodiments, the active growth material is incorporated into the nanostructure during growth. For example, growth may result in the formation of a material that comprises a nanostructure surrounding the active growth material.

In some embodiments, the active growth material lowers the activation energy of the chemical reaction used to grow the nanostructures from the precursor. According to certain embodiments, the active growth material catalyzes the chemical reaction(s) by which the nanostructures are grown from the precursor.

In certain embodiments, the active growth material is formed from an active growth material precursor which undergoes a phase change or chemical change prior to carbon-based nanostructure growth. As noted above, it should be understood that, where active growth materials and their associated properties are described elsewhere herein, either or both of the active growth material itself and the active growth material precursor may have the properties described as being associated with the active growth material. In some embodiments, an active growth material precursor may be provided (e.g., applied to an optional substrate) in one form and then undergo a physical or chemical transition (e.g., during a heating step, during exposure to a nanostructure precursor) prior to forming the active growth material. For example, in some embodiments, the active growth material precursor may melt, become oxidized or reduced, become activated, or undergo any physical or chemical change prior to forming the active growth material.

In some cases, the nanostructures may be removed from the growth material after the nanostructures are formed. For example, the act of removing may comprise transferring the nanostructures directly from the surface of the growth material to a surface of a receiving substrate. The receiving substrate may be, for example, a polymer material or a carbon fiber material. In some cases, the receiving substrate comprises a polymer material, metal, or a fiber comprising $Al_2O_3$, $SiO_2$, carbon, or a polymer material. In some cases, the receiving substrate comprises a fiber comprising $Al_2O_3$, $SiO_2$, carbon, or a polymer material. In some embodiments, the receiving substrate is a fiber weave.

Removal of the nanostructures may comprise application of a mechanical tool, mechanical or ultrasonic vibration, a chemical reagent, heat, or other sources of external energy, to the nanostructures and/or the surface of the growth substrate. In some cases, the nanostructures may be removed by application of compressed gas, for example. In some cases, the nanostructures may be removed (e.g., detached) and collected in bulk, without attaching the nanostructures to a receiving substrate, and the nanostructures may remain in their original or "as-grown" orientation and conformation (e.g., in an aligned "forest") following removal from the growth material. Systems and methods for removing nanostructures from a substrate, or for transferring nanostructures from a first substrate to a second substrate, are described in International Patent Application Serial No. PCT/US2007/011914, filed May 18, 2007, entitled "Continuous Process for the Production of Nanostructures Including Nanotubes," which is incorporated herein by reference in its entirety.

In some embodiments, nanostructures may be grown on active growth materials which are subsequently removed from the nanostructures. For example, the nanostructures may be grown on the active growth material at a first temperature and then may be heated to a second, higher, temperature at which the active growth material is removed (e.g., by thermal evaporation).

According to certain embodiments, nanostructures (e.g., alumina nanotubes) can be synthesized by using another nanostructure as a template. For example, in certain embodiments, a first elongated nanostructure type is grown, after which a second material is formed over the first elongated nanostructure. The second material may be formed over the first elongated nanostructure material as a conformal coating, for example. In some embodiments, after the second material has been formed over the first nanostructure material, the first nanostructure material can be removed (e.g., via dissolution, oxidation, etching, or any of a number of other methods). As one specific example, in some embodiments, carbon nanotubes are first grown (e.g., using CVD). After the carbon nanotubes have been grown, a metal oxide (e.g., alumina) can be deposited over the carbon nanotubes, for example, by depositing a metal and subsequently oxidizing the metal, or by depositing the metal oxide itself. After the metal oxide has been formed, the carbon nanotubes can be removed, for example, via heat treatment and/or oxidation. In some embodiments, the metal oxide can be crystallized during the heat treatment step, resulting in metal oxide-based nanostructures (e.g., metal oxide nanotubes such as alumina nanotubes). Other techniques for the synthesis of metal oxide-based (e.g., alumina-based) nanostructures (e.g., nanotubes) comprise hydrolysis of metal containing reactants (e.g., Al-containing reactants), polymerization of metal-containing reactants (e.g., Al-containing reactants), hydrothermal methods, and the like.

U.S. Provisional Application No. 62/591,402, filed Nov. 28, 2017, and entitled "Separators Comprising Elongated Nanostructures and Associated Devices and Methods, Including Devices and Methods for Energy Storage and/or Use," is incorporated herein by reference in its entirety for all purposes.

The following examples are intended to illustrate certain embodiments of the present invention, but do not exemplify the full scope of the invention.

EXAMPLES

Exemplary composites were fabricated using aligned alumina nanotubes (ANTs), using standard commercial separators, and without ANTs and without separators. The composites made using aligned alumina nanotubes are referred to below as cANT composites; the composites made using standard commercial separators are referred to below as cSEP composites; and the composites made without ANTs and without separators are referred to below as cREF composites.

cANT composites showed mechanical properties that were similar to the cREF composites. On the other hand, cSEP composites exhibited severe delamination starting at very low loads. ANTs embedded on polymer electrolyte revealed two times higher ionic conductivity than the pure polymer electrolyte by disrupting its semi-crystallinity. This new structural separator architecture promises not only to allow standard CFRP to act as multifunctional capacitors or supercapacitors maintaining its mechanical properties but also to enhance energy storage capabilities.

Example 1

This example describes fabrication and mechanical testing of ANT reinforced composites (cANT composites).

Alumina nanotube (ANTs) were synthesized by using carbon nanotubes as templates. Vertically aligned carbon nanotubes (VACNT) forests were grown in a quartz tube furnace at atmospheric pressure via a thermal catalytic chemical vapor deposition process. Silicon wafer pieces coated with catalyst (1/10 nm of Fe/$Al_2O_3$) by electron-beam physical vapor deposition were placed in the quartz tube reactor and pretreated at 680° C. for 15 minutes in a reducing atmosphere ($H_2$/He) to condition the catalyst. The silicon wafer pieces coated with catalyst were subjected to a reactant mixture ($H_2$/He/$C_2H_4$) for 60 seconds. In order to facilitate the transfer of the carbon nanotubes, a delamination step was applied in which a mild carbon etching atmosphere ($H_2$/He/$H_2O$) removes carbon co-products, reducing the attachment between the carbon nanotubes and the Si substrate. The resultant VACNT forests had an areal density of 1.6 vol %, with each carbon nanotube having an outer diameter of about 8 nm, giving an inter-carbon nanotube spacing of about 60 nm. The VACNT forests were nominally 30 micrometers in length with non-trivial variability (±10 micrometers). In order to facilitate the transfer to the prepreg, an additional etching step was added after VACNT growth to partially remove carbon side-products that promote adhesion of the VACNTs, and subsequently ANTs, to the substrate. While a short etching step makes the transfer difficult, an excessively long etching step promotes self-delamination of ANTs before transfer.

Figure 6A:
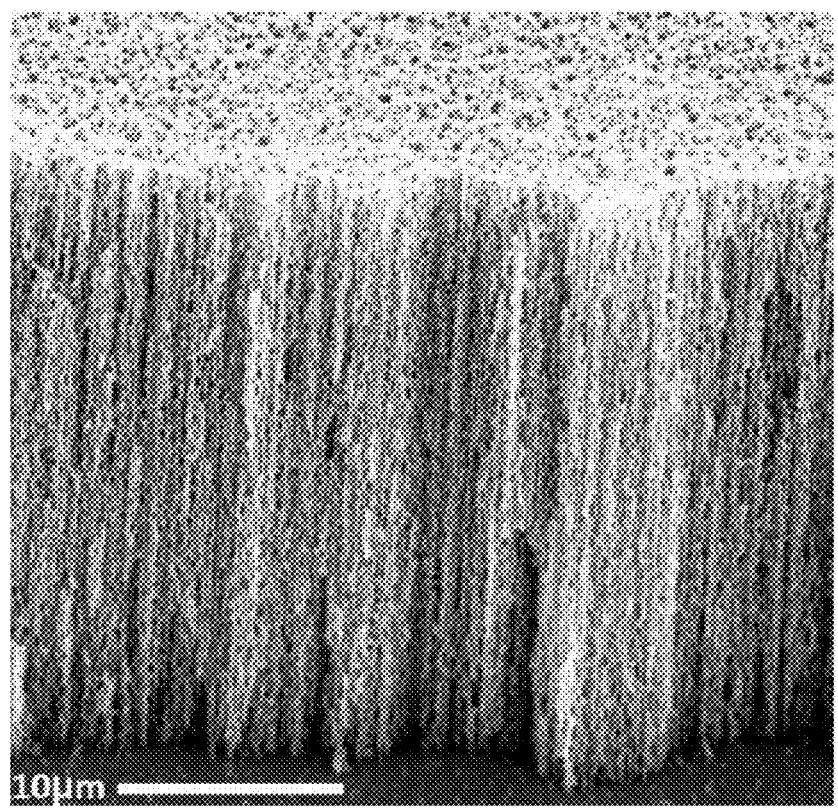
FIG. 6A is a SEM image of alumina nanotubes, according to certain embodiments.
Figure 6B:
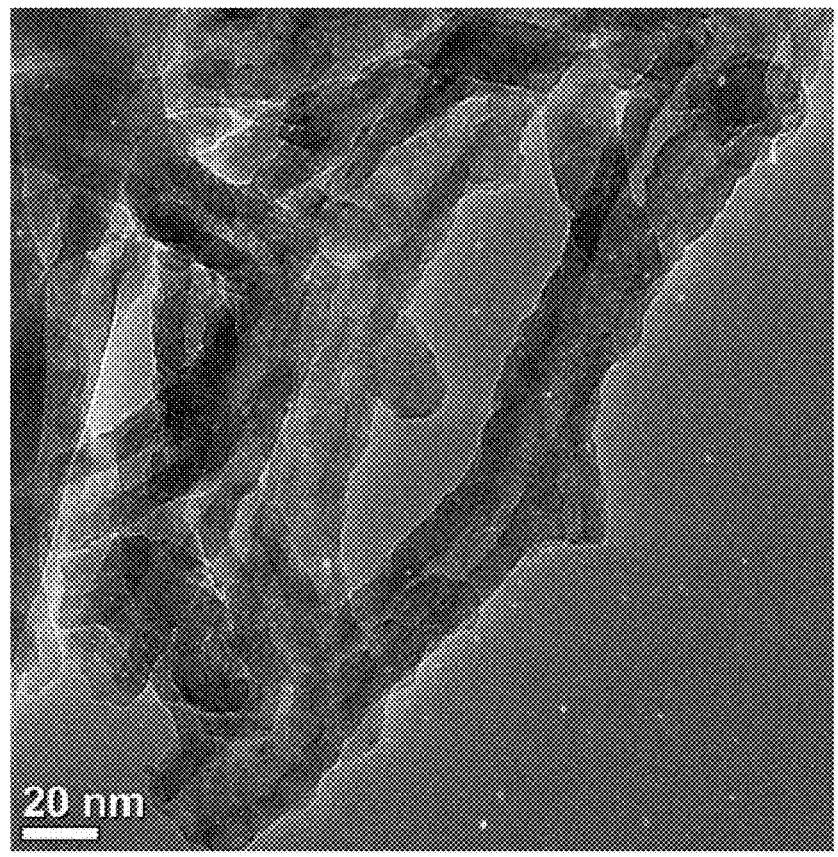
FIG. 6B is a TEM image of alumina nanotubes, according to certain embodiments.

$Al_2O_3$ was deposited onto the carbon nanotubes CNTs by atomic layer deposition (ALD). Trimethylaluminum (TMA) and ozone ($O_3$) were used as the metallorganic and oxidizing precursors, respectively. Using nitrogen as the carrier gas at a flow rate of 40 standard cubic centimeter per minute (sccm), TMA and $O_3$ were sequentially pulsed into the deposition chamber (2-3 torr, 175° C.) for 22 and 100 milliseconds, respectively. Following each precursor pulse, the chamber was purged with 90 sccm of nitrogen for 28 seconds. The $Al_2O_3$-covered carbon nanotubes were heat-treated at a rate of 1° C./minute in air in two steps: first at 550° C. for 1 hour and then at 1050° C. for another hour. The first step allowed all carbon to be removed without collapsing the $Al_2O_3$ shell, while the second step crystallized the $Al_2O_3$, resulting in polycrystalline alumina nanotubes (ANTs). Scanning electron (SEM) and electron diffraction spectroscopy (EDS) mapping was performed on gold metalized samples using a JEOL 6010 operating at 15 kV. Aberration-corrected transmission electron microscopy (TEM) was performed on a Libra Zeiss with an acceleration voltage of 80 kV. An SEM image and a TEM image of the ANTs are shown in FIG. 6A and FIG. 6B, respectively.

Figure 7A:
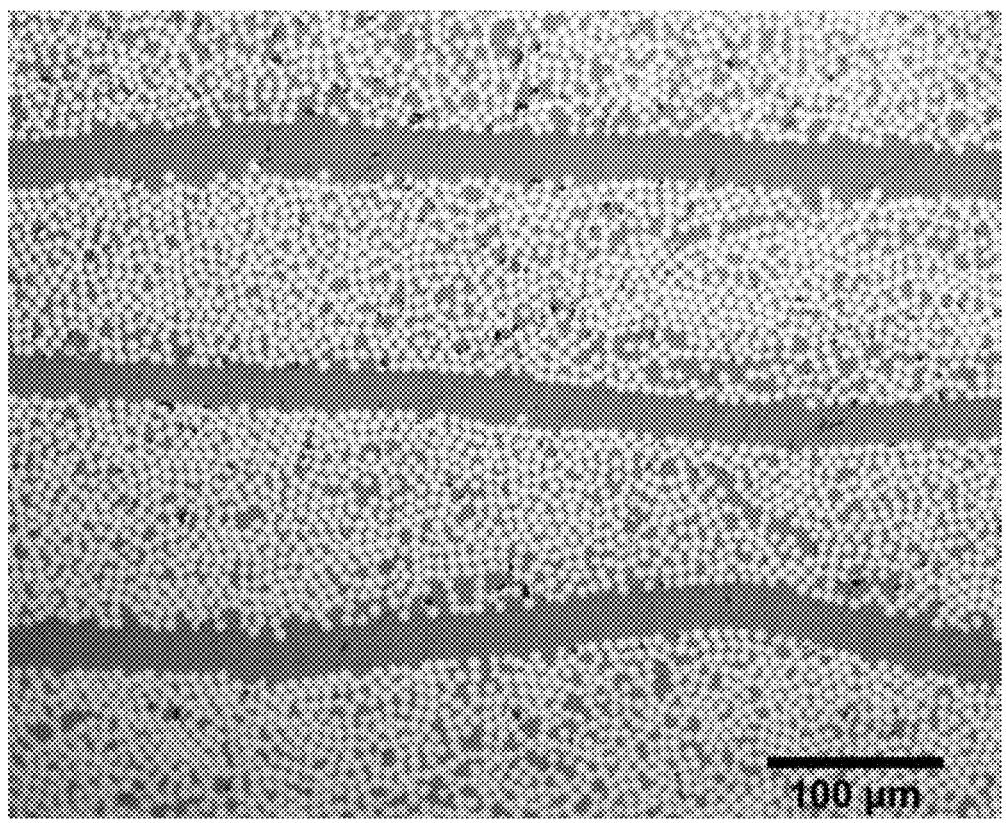
FIG. 7A is an optical image of an alumina nanotube composite structure, according to certain embodiments.
Figure 7B:
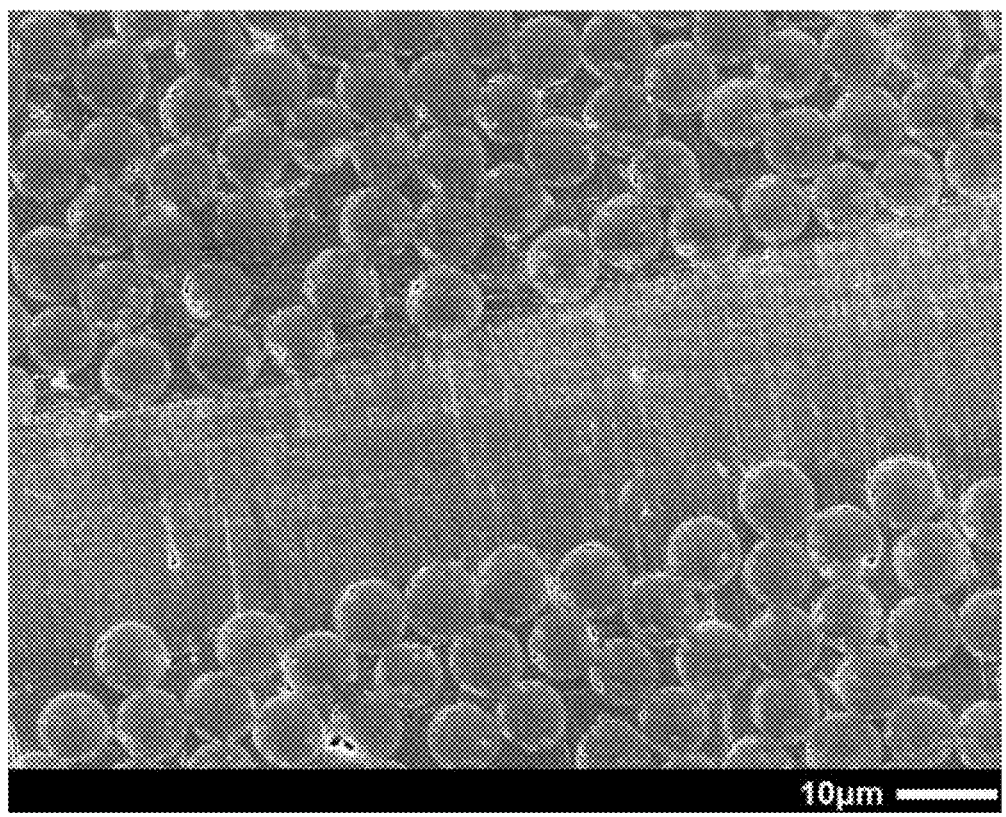
FIG. 7B is a SEM image of an alumina nanotube composite structure, according to certain embodiments.
Figure 8A:
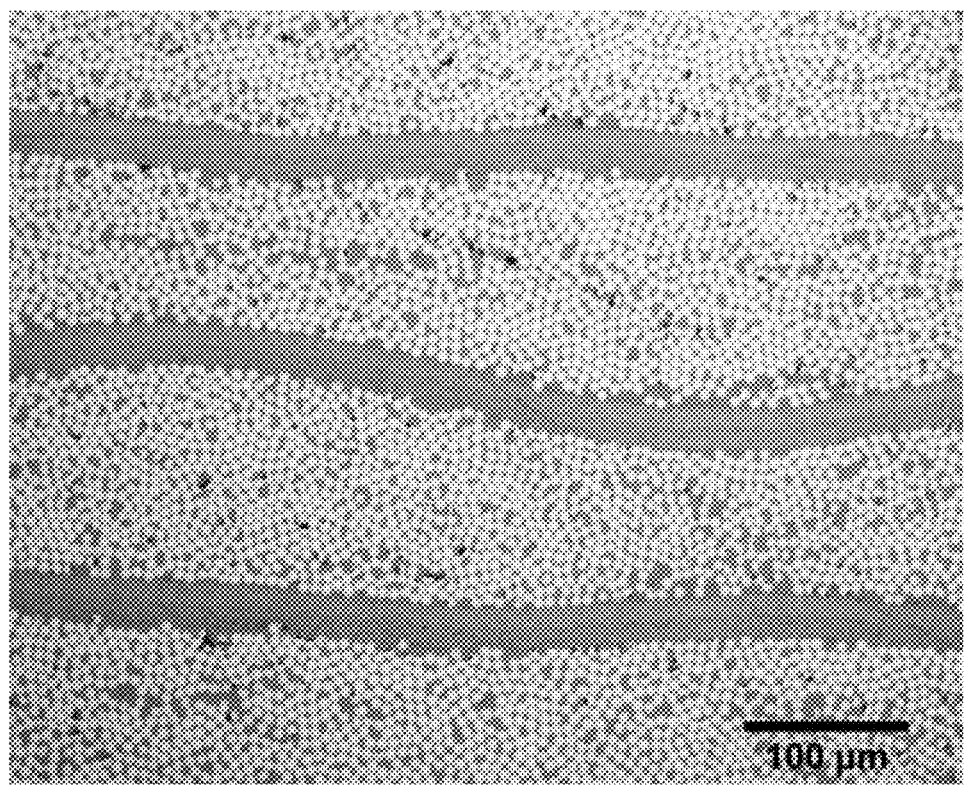
FIG. 8A is an optical image of a composite in which commercial separators have been placed between composite structure layers, according to certain embodiments.
Figure 8B:
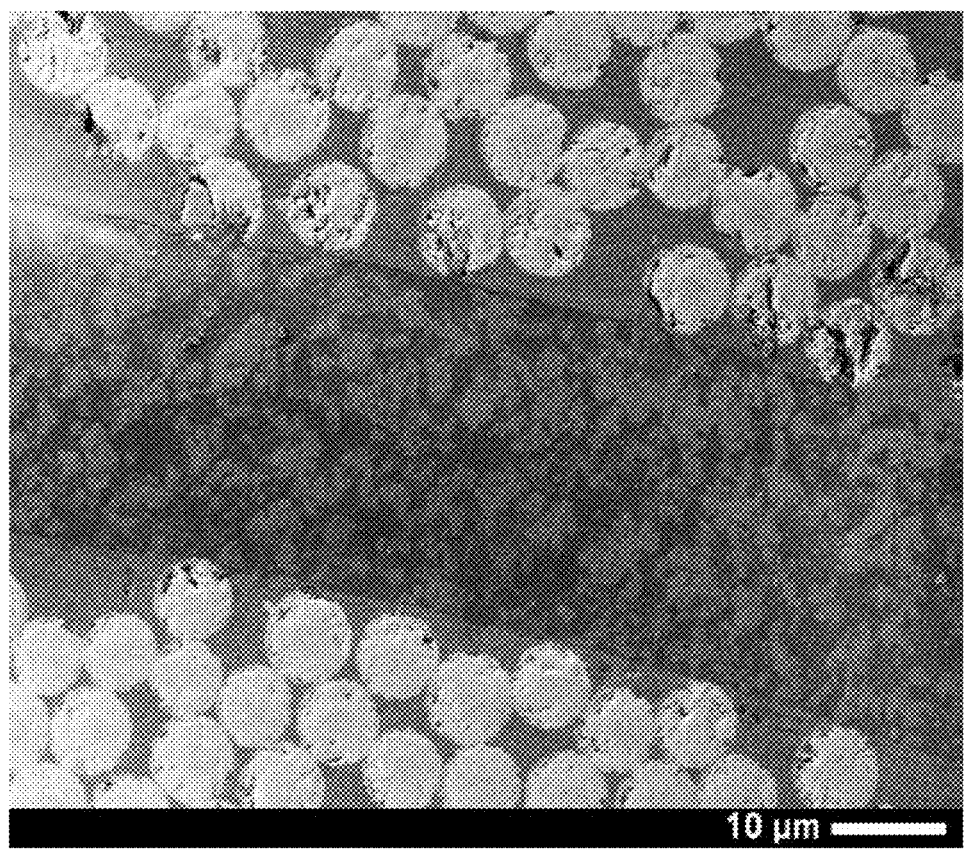
FIG. 8B is a SEM image of a composite in which commercial separators have been placed between composite structure layers, according to certain embodiments.
Figure 11A:
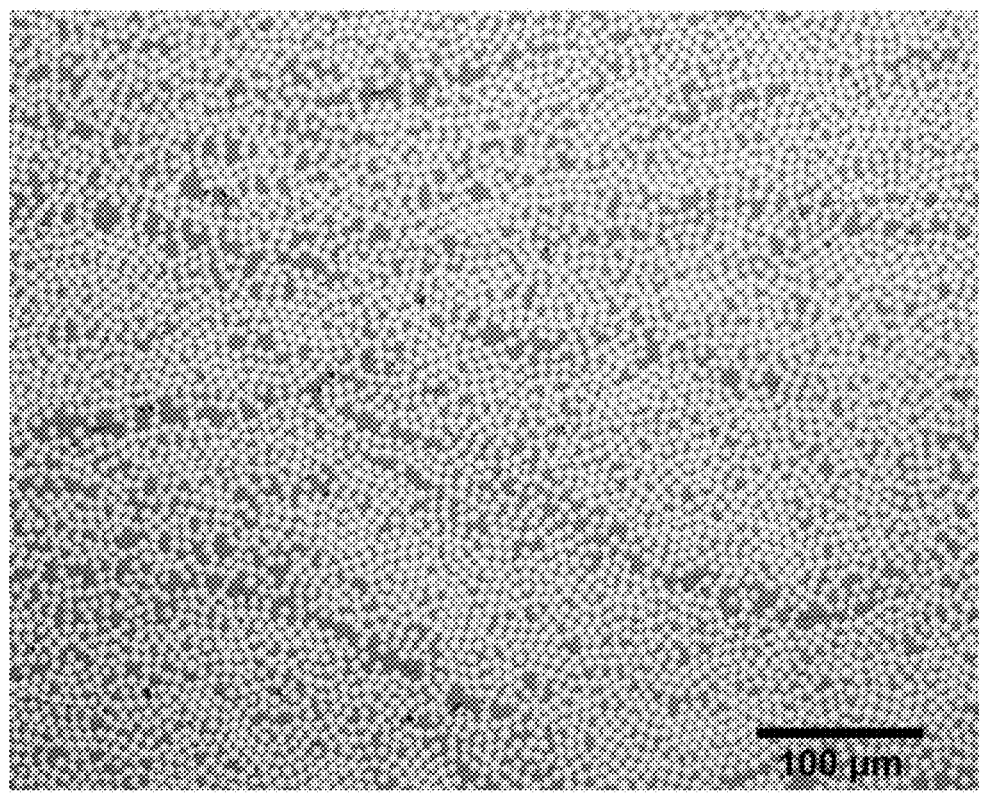
FIG. 11A is an optical image of an exemplary reference composite structure (cREF)
Figure 11B:
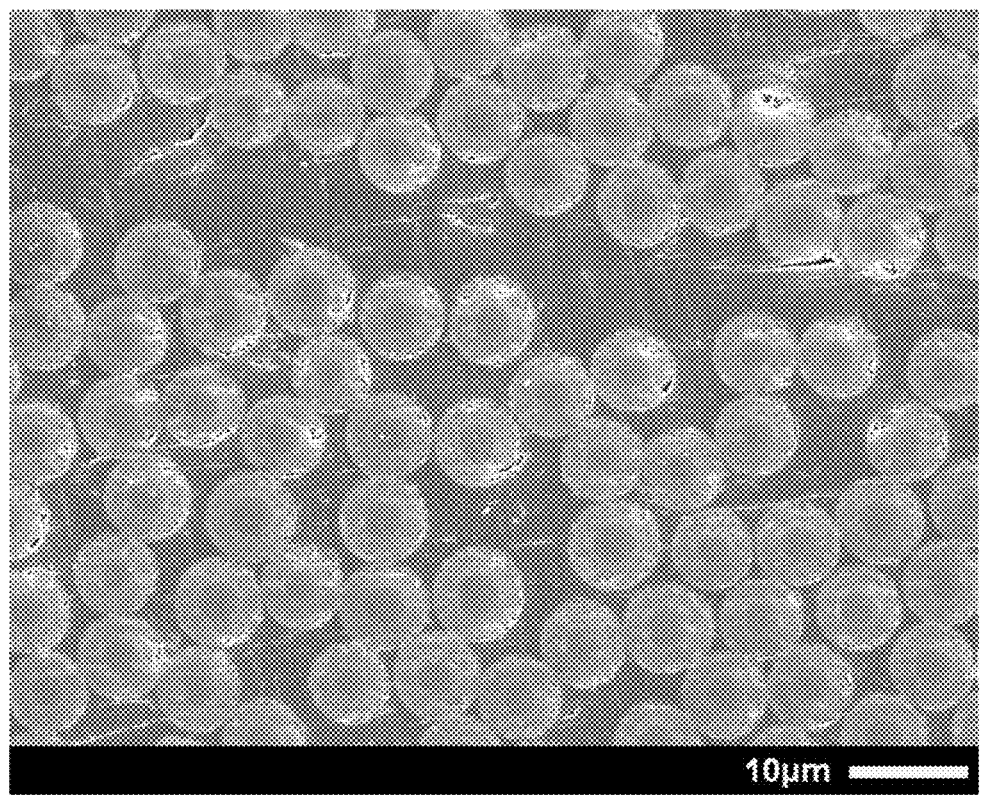
FIG. 11B is an SEM image of the exemplary reference composite structure shown in FIG. 11A.

The ANT forests were introduced to an interlaminar region between two composite prepreg plies by manually transferring the ANT forests to the surface of one of the composite prepreg plies. Unidirectional aerospace-grade carbon fiber and epoxy prepreg plies (Hexcel AS4/8552) were used. The silicon wafers were positioned with the ANT side in contact with the prepreg surface on top of a hot plate under heat (~60° C.) while moderate pressure was applied on the wafer side for each individual prepreg ply. Once the ANTs had attached to the tacky prepreg surface, the silicon wafers were removed, and the lay-up of the next ply continued until the lay-up was completed. A 16-ply unidirectional lay-up with 5 ANT-reinforced interfaces at the center of the laminate was created. The laminates were assembled with the appropriate cure materials, vacuum bagged, and cured in an autoclave following the industry process specifications (6 bar of total pressure at 1-3° C./minute to 110° C., hold for 1 hour, heat again at 1-3° C./min to 180° C., hold for 2 hours, cool down at 3-5° C./min to 60° C. and vent pressure, let cool to room temperature). Baseline and ANT specimens were cured in the same laminate. Optical and SEM images of the cANT composite structure are shown in FIG. 7A and FIG. 7B, respectively. For comparison, another composite was produced with the same layout using a standard commercial capacitor separator (Celgard® 3500) at the same 5 central interfaces of the laminate. An optical image of the commercial capacitor separator composite is shown in FIG. 8A, and an SEM image is shown in FIG. 8B. Reference composites (referred to as cREF composites), which did not include either ANTs or separators, were also fabricated. An optical image of an exemplary cREF composite is shown in FIG. 11A, and an SEM image is shown in FIG. 11B.

Once the laminates were cured, the edges were trimmed, and specimens were cut and polished to size following ASTM D2344/D2344M-16 testing standards. The laminates had a thickness of 2.05±0.02 mm.

Following the ASTM D2344/D2344M-16 testing standard, the specimens were cut with a diamond saw and then further polished to remove the defects from bandsaw cutting and to meet the dimension specification (2 mm thick, 4 mm wide, and 12 mm long). The polished specimens were subjected to a 3-point bending load (6 mm diameter for loading nose and 3 mm diameter for supports) with an 8 mm span. The test was performed on Zwick/Roell Z010 with a 10 kN load cell in displacement control. The specimen was loaded at 1 mm/min until either of the following occurred: (a) a load drop-off of 30%; (b) two-piece specimen failure; or (c) the head travel exceeded the specimen nominal thickness. Load and displacement were recorded every 250 ms, and the static short beam shear strength was calculated by Eq. 1.

$$\sigma_{SBS} = 0.75 \times \frac{F_{max}}{wt} \quad [1]$$

where $\sigma_{SBS}$ is the short-beam shear and $F_{max}$ is the maximum load. This value is a closed form approximation of the maximum shear based on classical beam theory. The effective flexural modulus E can also be obtained from the same test and was calculated by Eq. 2.

$$E = \frac{s^3 F}{4wt^3 d} \quad [2]$$

where F is the load, and d is the displacement.

Figure 12A:
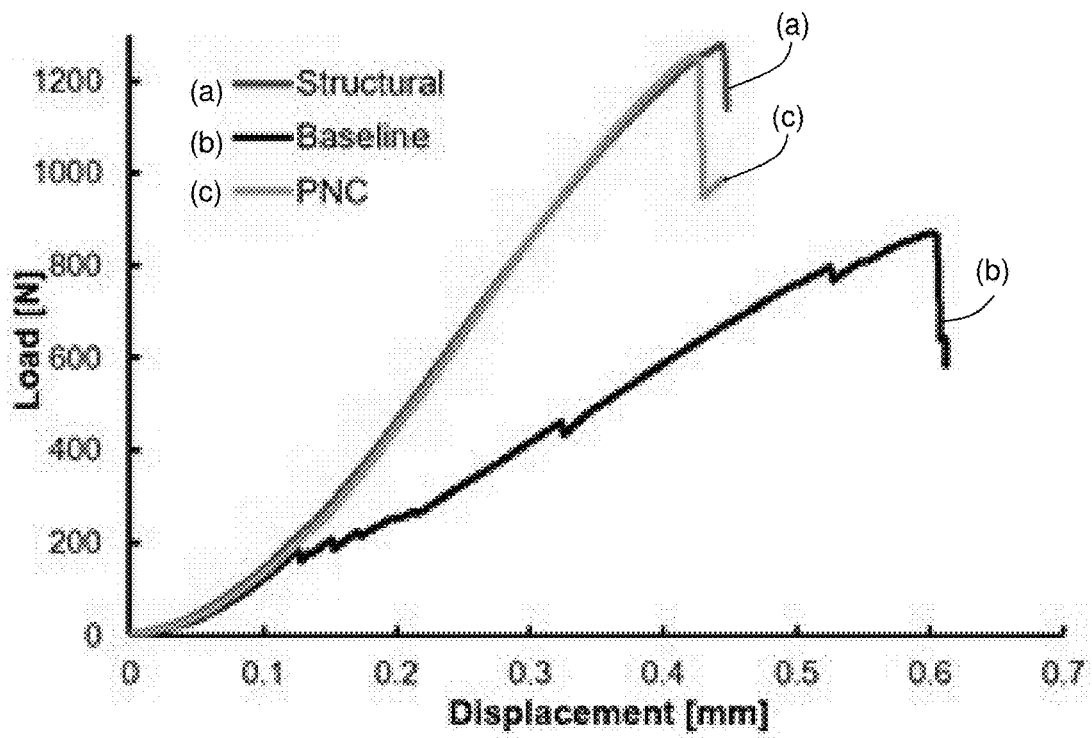
FIG. 12A shows, in accordance with certain embodiments, a plot of standard force as a function of standard travel for a reference composite (Structural), a composite with a commercial separator (Baseline), and a composite with alumina nanotubes (PNC)
Figure 12B:
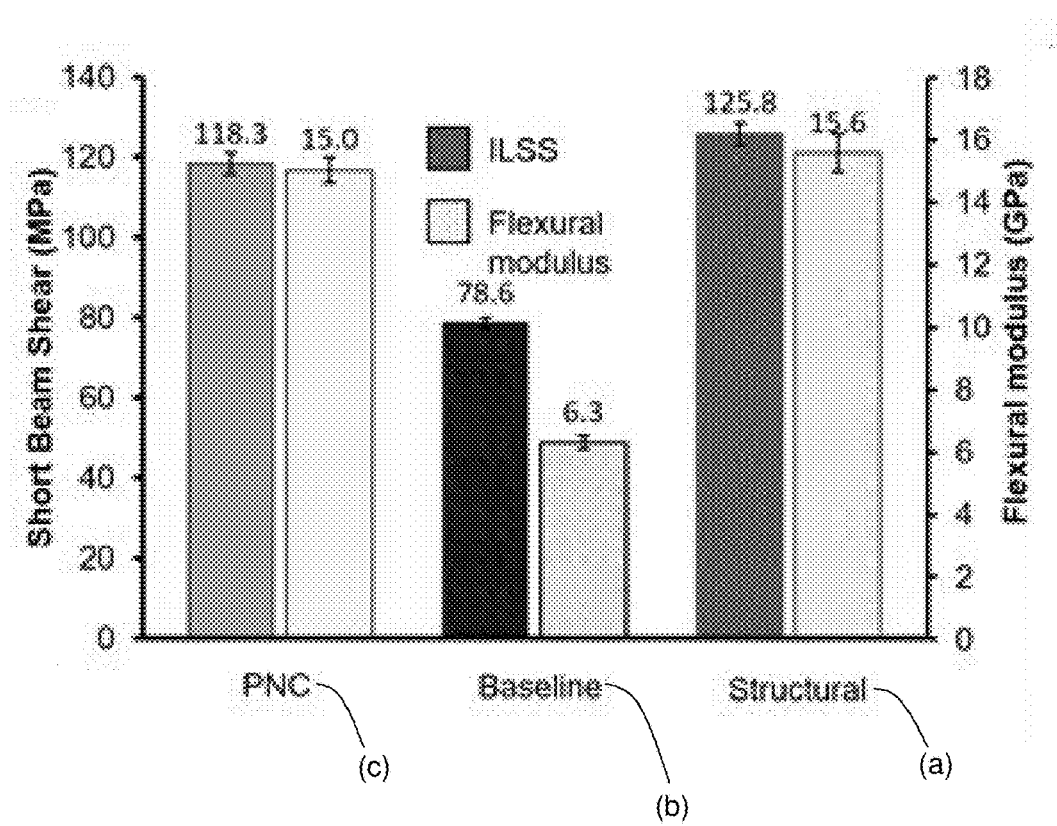
FIG. 12B shows, in accordance with certain embodiments, the short beam shear strength and flexural modulus for a reference composite (Structural), a composite with a commercial separator (Baseline), and a composite with alumina nanotubes (PNC)

FIG. 12A shows a plot of standard force as a function of standard travel for a cREF composite, a cSEP composite, and a cANT composite. As shown in FIG. 12B, the cREF composite exhibited a short beam shear strength of 125.8 MPa and a flexural modulus of 15.6 GPa; the cANT composite exhibited a short beam shear strength of 118.3 MPa and a flexural modulus of 15.0 GPa; and the cSEP composite exhibited a short beam shear strength of 78.6 MPa and a flexural modulus of 6.3 GPa.

Figure 13:
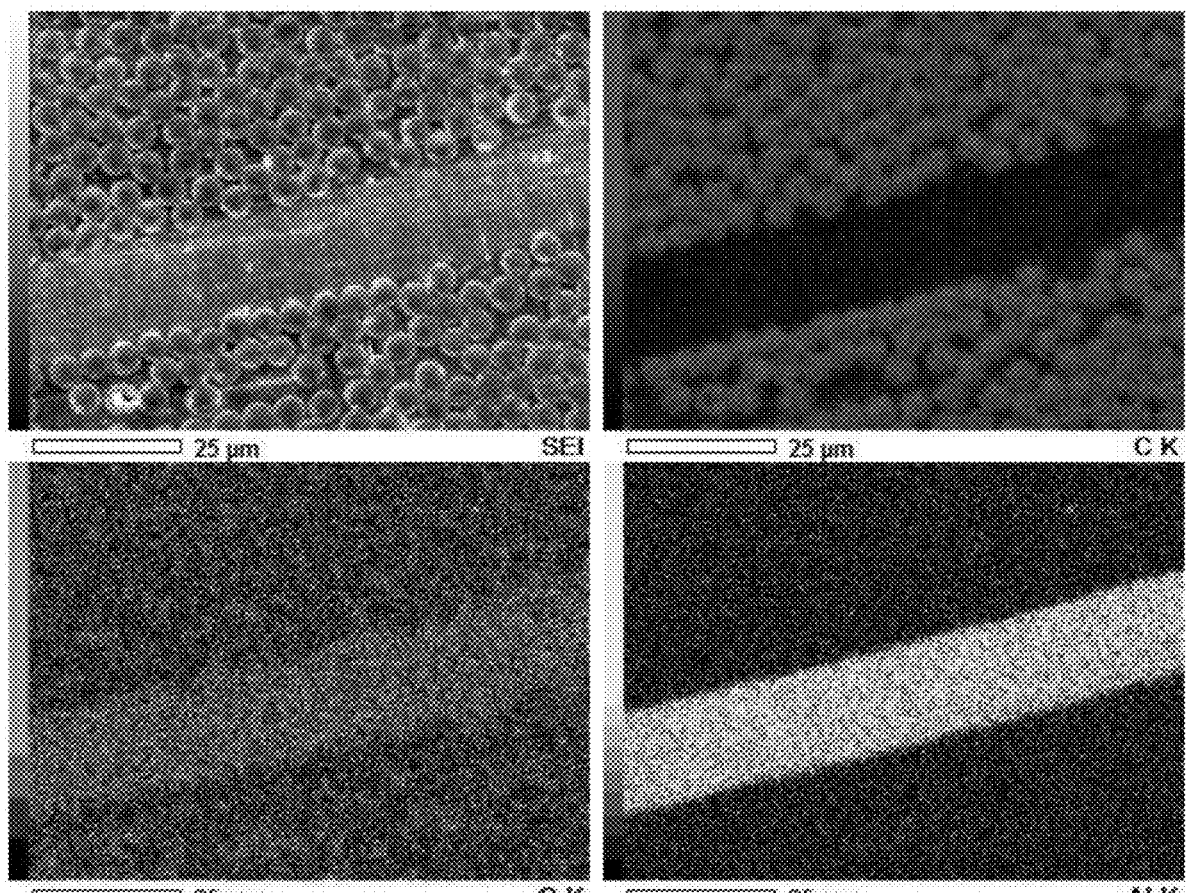
FIG. 13 shows an exemplary Energy Dispersive X-Ray Spectroscopy (EDS) mapping of a composite comprising alumina nanotubes, according to certain embodiments.

Electron Dispersive X-ray Spectroscopy (EDS) mapping was performed on gold metalized samples by a JEOL 6010 scanning electron microscope operating at 15 kV. High resolution scanning electron microscopy (HRSEM) was performed on samples by a JEOL 6700 cold field-emission gun operating at 10 kV. FIG. 13 shows an exemplary EDS mapping of a cANT composite comprising alumina nanotubes, according to certain embodiments. As shown in the lower two panels of FIG. 13, O and Al (in the form of alumina) were present in the intermediate layer of the composite. The top and bottom layers of the composite were primarily made of carbon, from the carbon fibers of the prepregs).

Example 2

This example describes the evaluation of the electrochemical performance of the synthesized ANTs.

ANT forests were synthesized over a silicon substrate using the processes described in Example 1.

The out-of-plane electrical resistivity for the composite was acquired by first polishing the composite until the fibers were exposed. Small metal plates were then pressed on each side of the composite during the measurements to ensure good contact. The electrical resistance was recorded by an Agilent 34461A digital multimeter.

Figure 9A:
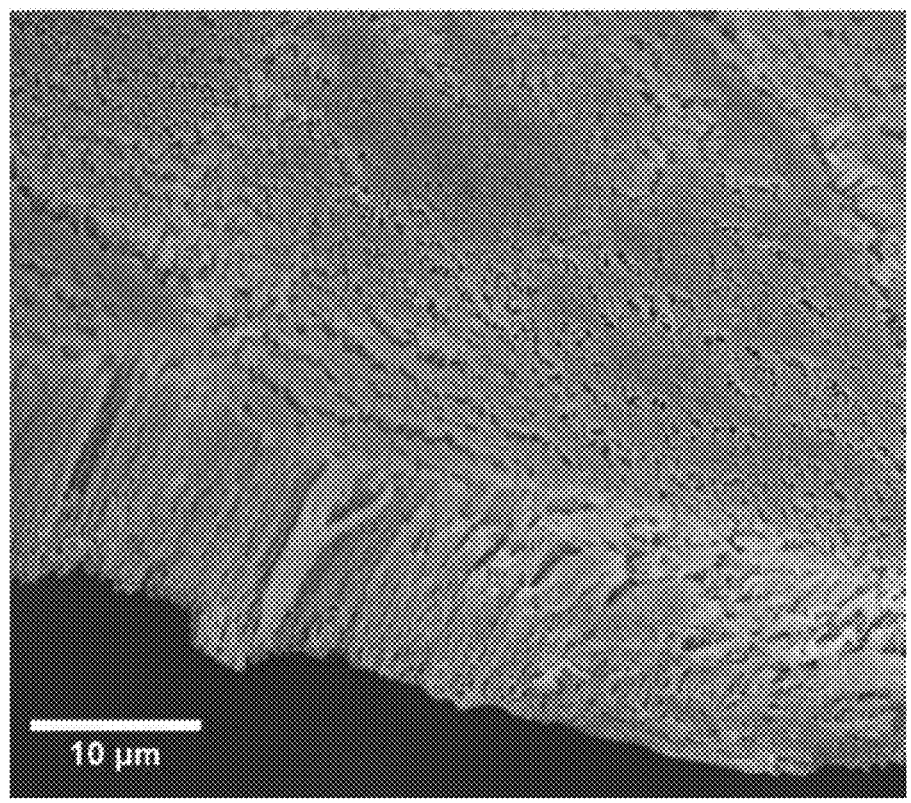
FIG. 9A is a SEM image of a (P(VDF-HFP))/alumina nanotube composite structure, according to certain embodiments.
Figure 9B:
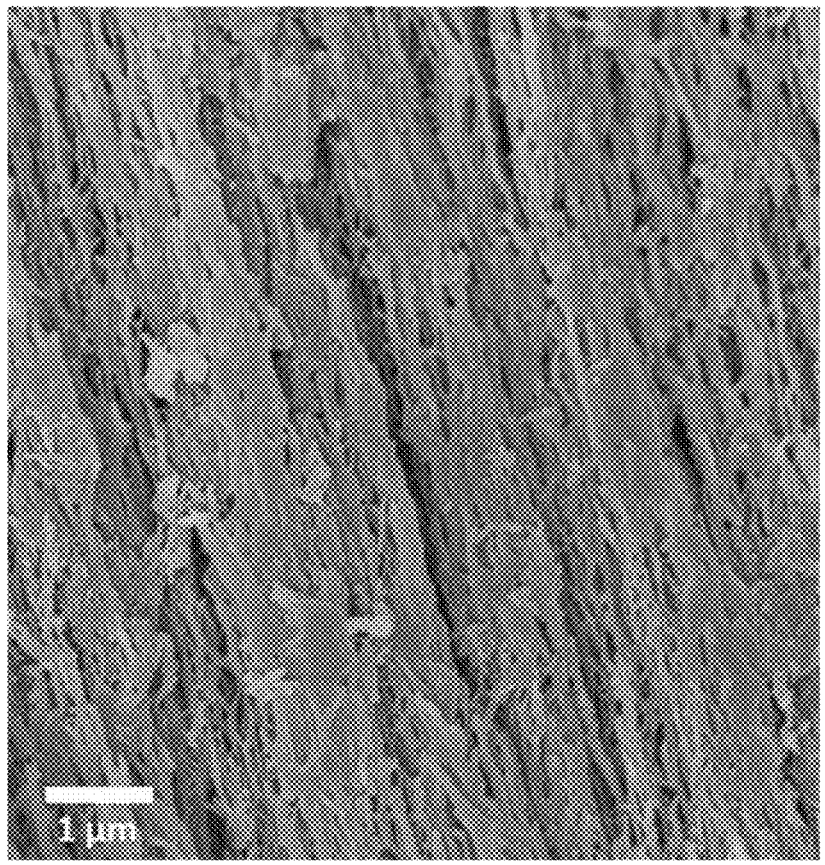
FIG. 9B is a SEM image of a (P(VDF-HFP))/alumina nanotube composite structure, according to certain embodiments.

Poly(vinylidene fluoride-co-hexafluoropropylene) (P(VDF-HFP)) pellets (5 wt. %) were dispersed in N-methyl-2-pyrrolidone (NMP) by stirring at room temperature for at least 6 hours until a stable solution was formed. The synthesized P(VDF-HFP)/NMP solution was infiltrated into the ANT forests over the silicon substrate by pouring 2 mL solution on top of the sample (2×3 cm) and keeping it under vacuum overnight until dry. In a similar approach, pure P(VDF-HFP) membranes were synthesized on bare silicon wafers based on a solution casting method. The P(VDF-HFP) and P(VDF-HFP)/ANT composites were then annealed at 100° C. for 2 hours and then peeled off from the substrate. SEM images of the (P(VDF-HFP))/ANT composite are shown in FIG. 9A and FIG. 9B.

Figure 14A:
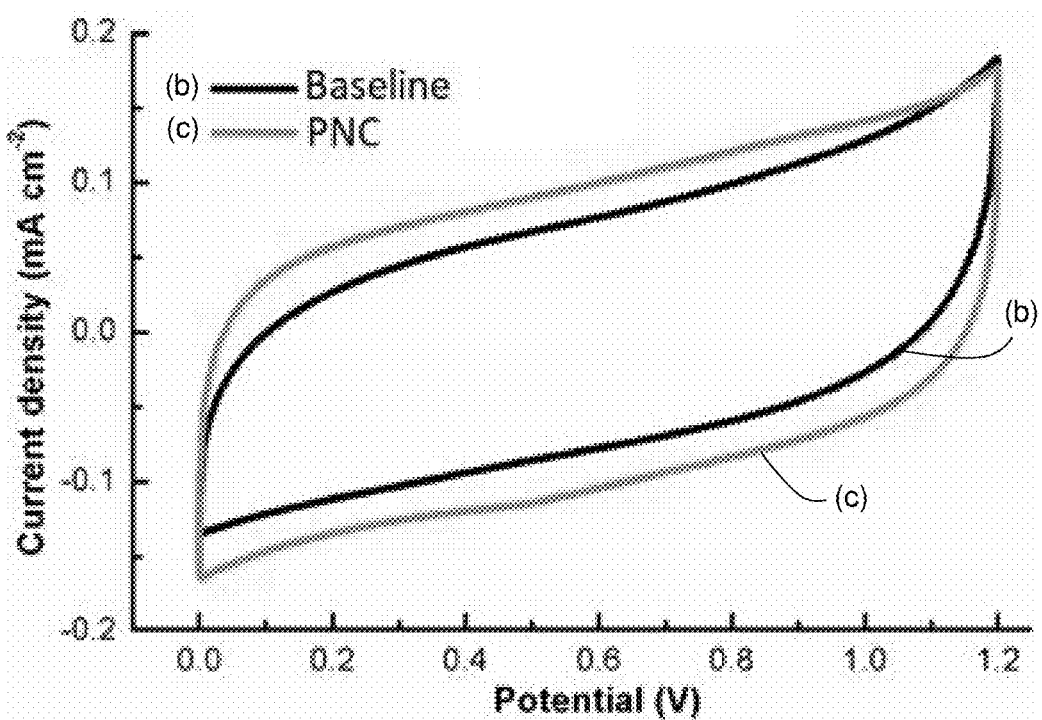
FIG. 14A shows, in accordance with certain embodiments, cyclic voltammograms of a composite with a commercial separator (Baseline) and a composite with alumina nanotubes (PNC) obtained from 0.0 V to 1.2 V under a scan rate of 100 mV/s.
Figure 14B:
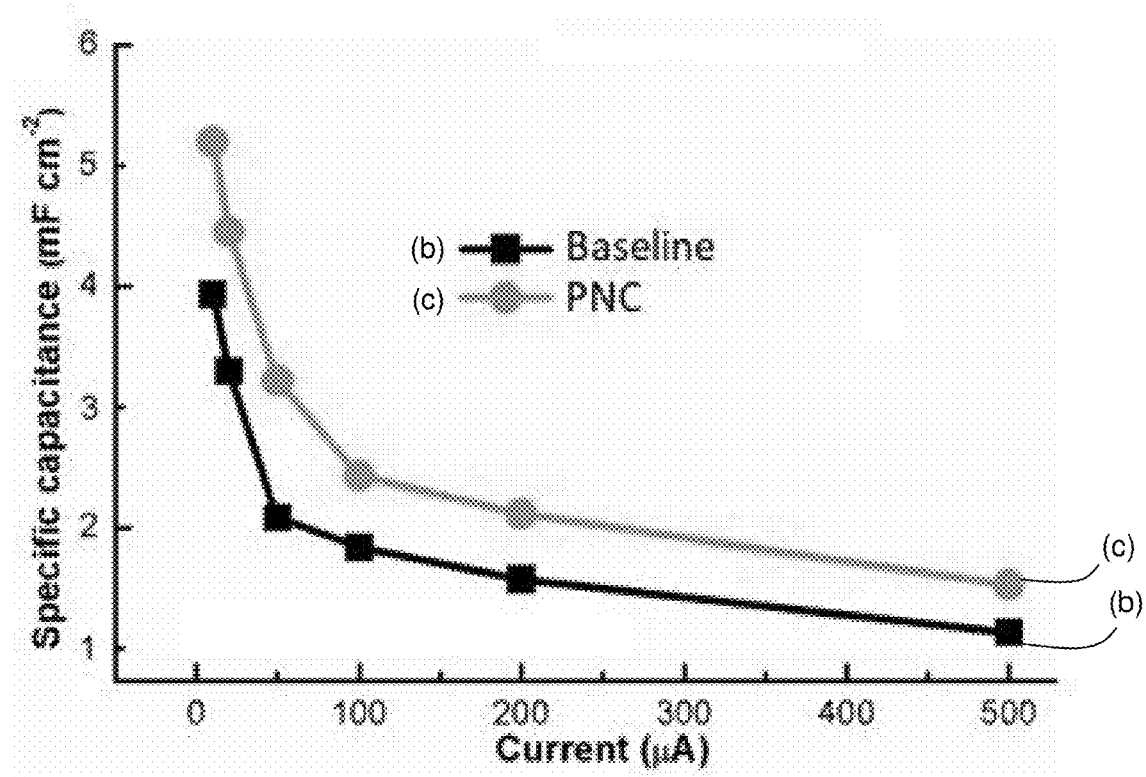
FIG. 14B shows, in accordance with certain embodiments, the specific capacitance of a composite with a commercial separator (Baseline) and a composite with alumina nanotubes (PNC) obtained under different constant currents.

Supercapacitor cells were prepared by assembling two carbon fibers films as electrodes, separated by a P(VDF-HFP) film or P(VDF-HFP)/ANT composite. The electrochemical performances of the assembled energy storage devices were characterized by an electrochemical work station (VersaSTAT 4, Princeton Applied Research). The specific capacitance of cells was obtained from cyclic voltammetry (CV) tests with scan rates from 5 mV/s to 100 mV/s. FIG. 14A shows, in accordance with certain embodiments, cyclic voltammograms of a composite with a commercial separator and a composite with alumina nanotubes obtained from 0.0 V to 1.2 V under a scan rate of 100 mV/s. FIG. 14B shows, in accordance with certain embodiments, the specific capacitance of a composite with a commercial separator and a composite with alumina nanotubes (PNC) obtained under different constant currents The ionic conductivity of composites and pure P(VDF-HFP) films were measured based on electrochemical impedance spectroscopy (VersaSTAT 4) with the frequency range from 0.01 Hz to 100 kHz and an AC amplitude of 5 mV, as shown in FIG. 10B.

Figure 10A:
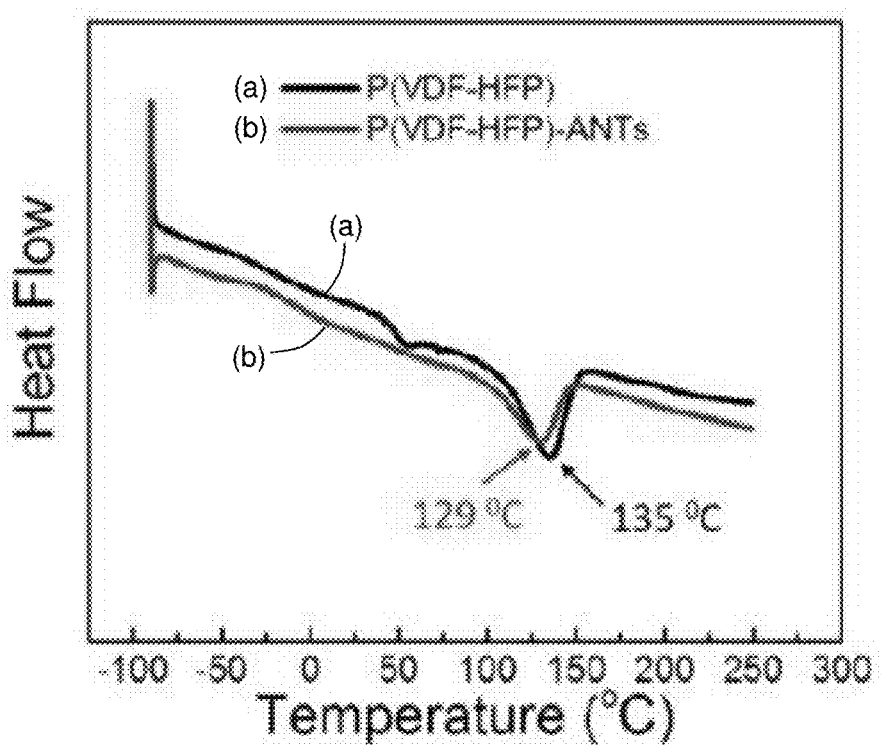
FIG. 10A shows, in accordance with certain embodiments, differential scanning calorimetry plots for a (P(VDF-HFP))/alumina nanotube composite structure and a P(VDF-HFP) structure.
Figure 10B:
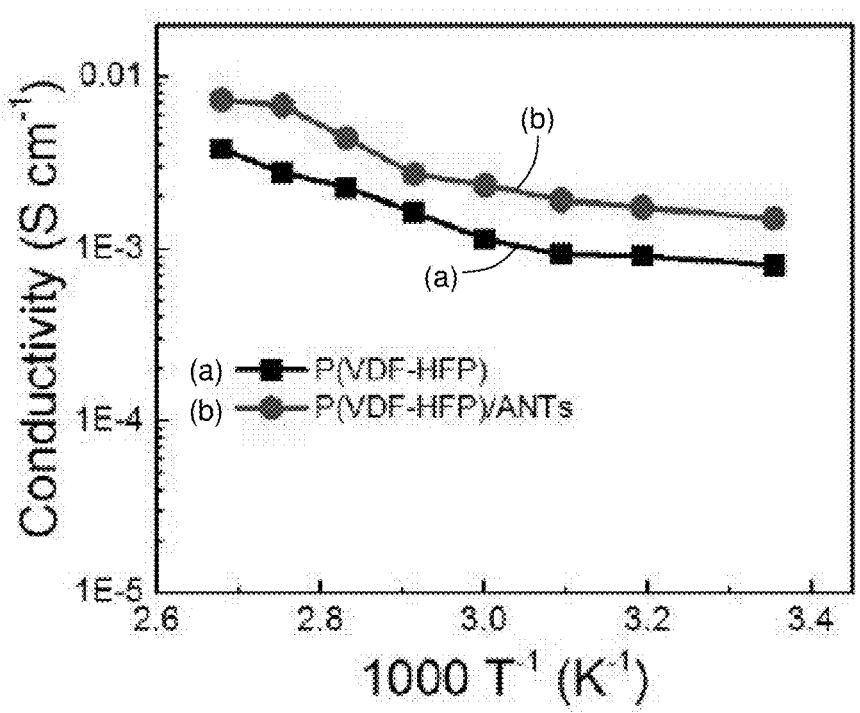
FIG. 10B shows, in accordance with certain embodiments, ionic conductivity plots for a (P(VDF-HFP))/alumina nanotube composite structure and a P(VDF-HFP) structure.
Figure 15:
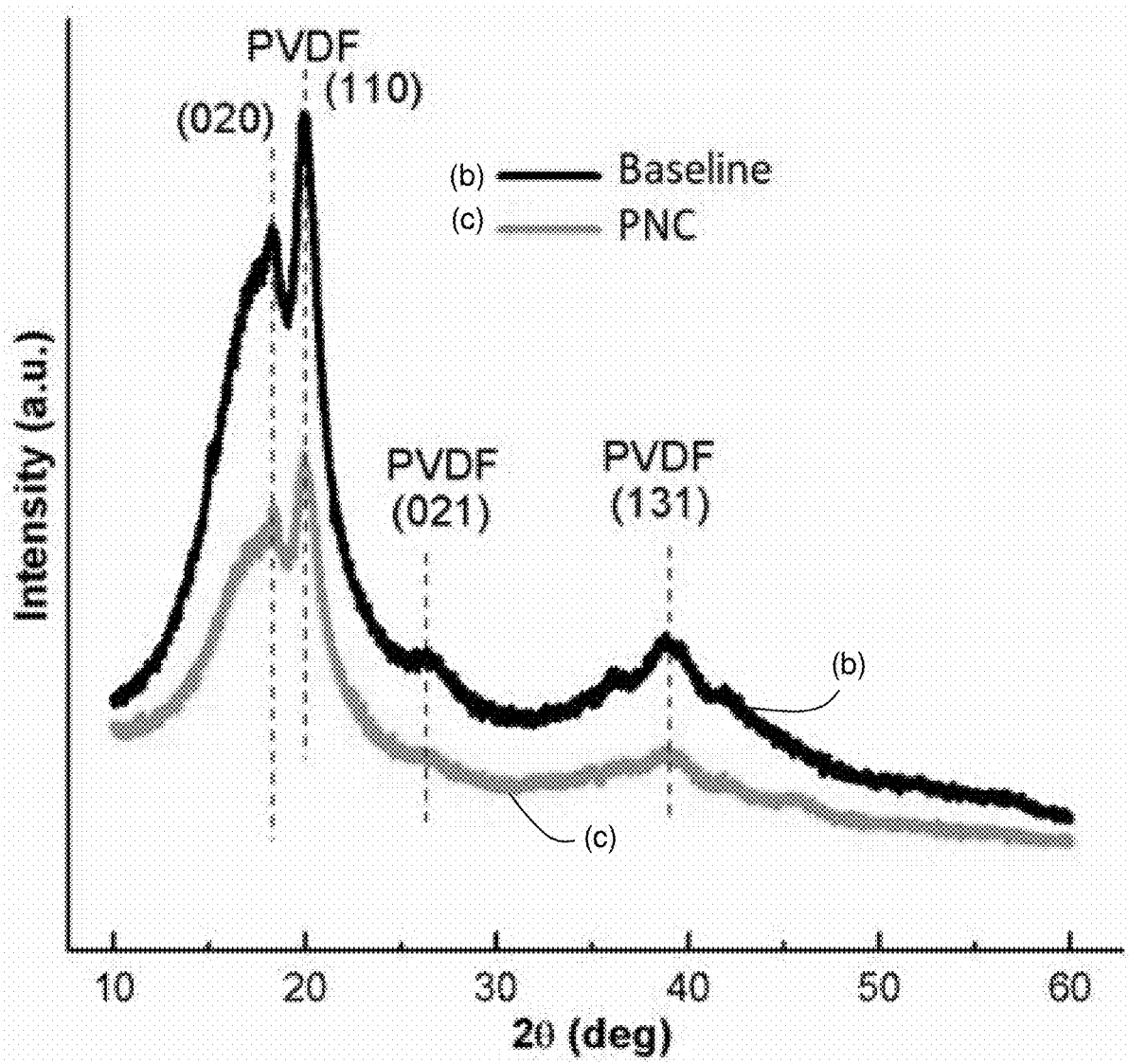
FIG. 15 shows, in accordance with certain embodiments, X-ray powder diffraction (XRD) data of a composite with a commercial separator (Baseline) and a composite with alumina nanotubes (PNC).

High resolution scanning electron microscopy (HRSEM) was performed on P(VDF-HFP) and P(VDF-HFP)/ANT by a JEOL 6700 cold field-emission gun operating at 10 kV. Aberration-corrected transmission electron microscopy (TEM) was performed on a Libra Zeiss with an acceleration voltage of 80 kV. The thermal properties of P(VDF-HFP)

and P(VDF-HFP)/ANT films were investigated by DSC using a RCS1-3277 (TA Instruments), as shown in FIG. 10A. The measurement was performed with a constant heating rate of 10° C./min in a nitrogen atmosphere from −90° C. to 250° C. As shown in FIG. 15, XRD data shows that PVDF peak intensities of the composite with alumina nanotubes decrease as compared to a composite with a commercial separator, indicating a higher amorphous to crystalline volume ratio.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An article, comprising:
a first electronically conductive solid substrate;
a second electronically conductive solid substrate; and
an ionically conductive and electronically insulating region between a surface of the first electronically conductive solid substrate and a surface of the second electronically conductive solid substrate, wherein the ionically conductive region comprises a plurality of electronically insulating elongated nanostructures extending from the first electronically conductive solid substrate to the second electronically conductive solid substrate,
wherein the elongated nanostructures have aspect ratios of greater than or equal to 10, and
wherein the elongated nanostructures are within 10° of perpendicular to the surface of the first electronically conductive solid substrate and/or the surface of the second electronically conductive solid substrate.

2. The article of claim 1, wherein the first electronically conductive solid substrate comprises an electronically conductive material disposed within an electronically insulating support material.

3. The article of claim 1, wherein the first electronically conductive solid substrate comprises a prepreg.

4. The article of claim 1, wherein the first electronically conductive solid substrate is or is part of an electrode.

5. The article of claim 1, wherein the first electronically conductive solid substrate comprises polymeric material, silicon, carbon, a ceramic, and/or a metal.

6. The article of claim 1, wherein the second electronically conductive solid substrate comprises an electronically conductive material disposed within an electronically insulating support material.

7. The article of claim 1, wherein the second electronically conductive solid substrate comprises a prepreg.

8. The article of claim 1, wherein the second electronically conductive solid substrate is or is part of an electrode.

9. The article of claim 1, wherein the second solid electronically conductive substrate comprises polymeric material, silicon, carbon, a ceramic, and/or a metal.

10. The article of claim 1, wherein the plurality of electronically insulating elongated nanostructures are supported by a support material.

11. The article of claim 10, wherein the support material comprises a monomer, a polymer, and/or a ceramic.

12. The article of claim 1, wherein the plurality of electronically insulating elongated nanostructures comprise nanotubes, nanofibers, and/or nanowires.

13. The article of claim 1, wherein the plurality of electronically insulating elongated nanostructures comprise alumina, titania, $SiO_2$, $ZrO_2$, ZnO, and/or boron nitride.

14. The article of claim 13, wherein the plurality of electronically insulating elongated nanostructures comprise alumina nanotubes, alumina nanofibers, and/or alumina nanowires.

15. The article of claim 1, wherein the plurality of electronically insulating elongated nanostructures comprise carbon-based nanostructures.

16. The article of claim 15, wherein the plurality of electronically insulating elongated nanostructures comprise carbon nanotubes.

17. The article of claim 1, wherein the plurality of electronically insulating elongated nanostructures extends a distance at least 100 times greater than the average distance between adjacent electronically insulating elongated nanostructures in each of two orthogonal directions each perpendicular to the long axes of the electronically insulating elongated nano structures.

18. A method, comprising:
establishing an electric potential between a first electronically conductive solid substrate and a second electronically conductive solid substrate, wherein an ionically conductive and electronically insulating region between a surface of the first electronically conductive solid substrate and a surface of the second electronically conductive solid substrate comprises a plurality of electronically insulating elongated nanostructures extending from the first electronically conductive solid substrate to the second electronically conductive solid substrate,
wherein the elongated nanostructures have aspect ratios of greater than or equal to 10, and
wherein the elongated nanostructures are within 10° of perpendicular to the surface of the first electronically conductive solid substrate and/or the surface of the second electronically conductive solid substrate.

19. A method, comprising:
arranging a plurality of electronically insulating elongated nanostructures such that the electronically insulating elongated nanostructures extend from a first electronically conductive solid substrate to a second electronically conductive solid substrate, wherein a region between a surface of the first electronically conductive solid substrate and a surface of the second electronically conductive solid substrate is electronically insulating and ionically conductive,
wherein the elongated nanostructures have aspect ratios of greater than or equal to 10, and
wherein the elongated nanostructures are within 10° of perpendicular to the surface of the first electronically conductive solid substrate and/or the surface of the second electronically conductive solid substrate.

20. The article of claim 1, wherein the elongated nanostructures are within 10° of perpendicular to both the surface of the first electronically conductive solid substrate and the surface of the second electronically conductive solid substrate.

* * * * *